US008190291B2

(12) United States Patent
Beane et al.

(10) Patent No.: US 8,190,291 B2
(45) Date of Patent: *May 29, 2012

(54) AUTOMATED VENDING OF PRODUCTS CONTAINING CONTROLLED SUBSTANCES

(75) Inventors: John A. Beane, San Diego, CA (US); Linda J. Pinney, Del Mar, CA (US)

(73) Assignee: Asteres, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/861,767

(22) Filed: Aug. 23, 2010

(65) Prior Publication Data

US 2011/0047043 A1 Feb. 24, 2011

Related U.S. Application Data

(63) Continuation of application No. 11/740,253, filed on Apr. 25, 2007, now Pat. No. 7,783,379.

(51) Int. Cl.
G06F 17/00 (2006.01)
(52) U.S. Cl. .......................... 700/237; 700/236; 700/244
(58) Field of Classification Search .................. 700/236, 700/237, 244
See application file for complete search history.

(56) References Cited

U.S. PATENT DOCUMENTS

| | | |
|---|---|---|
| 1,968,226 A | 7/1934 | Simpkins |
| 3,786,421 A | 1/1974 | Wostl et al. |
| 3,941,977 A | 3/1976 | Voss et al. |
| 3,943,335 A | 3/1976 | Kinker et al. |
| 4,359,631 A | 11/1982 | Lockwood et al. |
| 4,456,122 A | 6/1984 | Kalal |
| 4,519,522 A | 5/1985 | McElwee |
| 4,546,901 A | 10/1985 | Buttarazzi |
| 4,812,629 A | 3/1989 | O'Neil et al. |
| 4,814,592 A | 3/1989 | Bradt et al. |
| 4,839,505 A | 6/1989 | Bradt et al. |

(Continued)

FOREIGN PATENT DOCUMENTS

WO WO-01/31593 5/2001

(Continued)

OTHER PUBLICATIONS

Request for Continued Examination (RCE) and Amendment as filed with the USPTO on Sep. 8, 2010 for U.S. Appl. No. 11/484,409.

(Continued)

*Primary Examiner* — Timothy Waggoner
(74) *Attorney, Agent, or Firm* — Goodwin Procter LLP; Kurt M. Kjelland

(57) ABSTRACT

The present invention provides for devices and methods for vending regulated products, particularly controlled substances, including those containing pseudoephedrine. The present invention allows for the identification of consumers through reliable log-in-procedures, allows the consumer to select items, validates whether the purchase request complies with regulations, to facilitate the delivery of the requested product to a consumer. Other embodiments include a vending machine that is placed into a retail environment in which software enforces validation of the purchasers' identities, limits the amount of pseudoephedrine for each purchaser within the regulations of local, state and federal agencies.
This invention reduces the resources which must be expended in retail locations to comply with regulatory agencies, to implement effective counter measures against illegal purchases of regulated and controlled substances, and to ensure the effective limitation of these substances within reasonable limits required for normal consumption.

57 Claims, 23 Drawing Sheets

U.S. PATENT DOCUMENTS

| | | | |
|---|---|---|---|
| 4,858,743 A | 8/1989 | Paraskevakos et al. |
| 4,866,255 A | 9/1989 | Sing |
| 4,896,024 A | 1/1990 | Morello et al. |
| 4,951,308 A | 8/1990 | Bishop et al. |
| 4,995,498 A | 2/1991 | Menke |
| 5,013,897 A | 5/1991 | Harman et al. |
| 5,020,958 A | 6/1991 | Tuttobene |
| 5,036,472 A | 7/1991 | Buckley et al. |
| 5,042,686 A | 8/1991 | Stucki |
| 5,059,772 A | 10/1991 | Younglove |
| 5,088,586 A | 2/1992 | Isobe et al. |
| 5,095,195 A | 3/1992 | Harman et al. |
| 5,105,978 A | 4/1992 | Trouteaud et al. |
| 5,113,351 A | 5/1992 | Bostic |
| 5,139,384 A | 8/1992 | Tuttobene |
| 5,143,193 A | 9/1992 | Geraci |
| 5,159,560 A | 10/1992 | Newell et al. |
| 5,172,829 A | 12/1992 | Dellicker |
| 5,205,436 A | 4/1993 | Savage |
| 5,212,649 A | 5/1993 | Pelletier et al. |
| 5,292,029 A | 3/1994 | Pearson |
| 5,303,844 A | 4/1994 | Muehlberger |
| 5,313,393 A | 5/1994 | Varley et al. |
| 5,337,920 A | 8/1994 | Clausen |
| 5,385,265 A | 1/1995 | Schlamp |
| 5,408,443 A | 4/1995 | Weinberger |
| 5,445,294 A | 8/1995 | Gardner et al. |
| 5,445,295 A | 8/1995 | Brown |
| 5,468,110 A | 11/1995 | McDonald et al. |
| 5,482,139 A | 1/1996 | Rivalto |
| 5,499,707 A | 3/1996 | Steury |
| 5,502,944 A | 4/1996 | Kraft et al. |
| 5,593,267 A | 1/1997 | McDonald et al. |
| 5,597,995 A | 1/1997 | Williams et al. |
| 5,713,485 A | 2/1998 | Liff et al. |
| 5,713,487 A | 2/1998 | Coughlin |
| 5,713,648 A | 2/1998 | Geib et al. |
| 5,713,847 A | 2/1998 | Howard et al. |
| 5,720,154 A | 2/1998 | Lasher et al. |
| 5,748,485 A | 5/1998 | Christiansen et al. |
| 5,790,409 A | 8/1998 | Fedor et al. |
| 5,797,515 A | 8/1998 | Liff et al. |
| 5,812,410 A | 9/1998 | Lion et al. |
| 5,838,575 A | 11/1998 | Lion |
| 5,839,257 A | 11/1998 | Soderstrom et al. |
| 5,880,443 A | 3/1999 | McDonald et al. |
| 5,893,459 A | 4/1999 | Croft |
| 5,893,697 A | 4/1999 | Zini et al. |
| 5,907,493 A | 5/1999 | Boyer et al. |
| 5,930,145 A | 7/1999 | Yuyama et al. |
| 5,945,651 A | 8/1999 | Chorosinski et al. |
| 5,963,453 A | 10/1999 | East |
| 5,971,593 A | 10/1999 | McGrady |
| 6,003,006 A | 12/1999 | Colella et al. |
| 6,021,392 A | 2/2000 | Lester et al. |
| 6,039,251 A | 3/2000 | Holowko et al. |
| 6,068,156 A | 5/2000 | Liff et al. |
| 6,131,399 A | 10/2000 | Hall |
| 6,152,364 A | 11/2000 | Schoonen et al. |
| 6,170,230 B1 | 1/2001 | Chudy et al. |
| 6,199,720 B1 | 3/2001 | Rudick et al. |
| 6,202,923 B1 | 3/2001 | Boyer et al. |
| 6,219,587 B1 | 4/2001 | Ahlin et al. |
| 6,230,927 B1 | 5/2001 | Schoonen et al. |
| 6,230,930 B1 | 5/2001 | Sorensen et al. |
| 6,256,967 B1 | 7/2001 | Hebron et al. |
| 6,263,259 B1 | 7/2001 | Bartur |
| 6,283,322 B1 | 9/2001 | Liff et al. |
| 6,305,377 B1 | 10/2001 | Portwood et al. |
| 6,324,520 B1 | 11/2001 | Walker et al. |
| 6,330,491 B1 | 12/2001 | Lion |
| 6,352,200 B1 | 3/2002 | Schoonen et al. |
| 6,354,498 B1 | 3/2002 | Lutz |
| 6,370,841 B1 | 4/2002 | Chudy et al. |
| 6,393,339 B1 | 5/2002 | Yeadon |
| 6,397,126 B1 | 5/2002 | Nelson |
| 6,397,193 B1 | 5/2002 | Walker et al. |
| 6,416,270 B1 | 7/2002 | Steury et al. |
| 6,421,579 B1 | 7/2002 | Dimitri et al. |
| 6,438,451 B1 | 8/2002 | Lion |
| 6,443,359 B1 | 9/2002 | Green et al. |
| 6,449,627 B1 | 9/2002 | Baer et al. |
| 6,449,927 B2 | 9/2002 | Hebron et al. |
| 6,464,142 B1 | 10/2002 | Denenberg et al. |
| 6,471,089 B2 | 10/2002 | Liff et al. |
| 6,499,627 B2 | 12/2002 | Arai |
| 6,505,754 B1 | 1/2003 | Kenny et al. |
| 6,522,772 B1 | 2/2003 | Morrison et al. |
| 6,529,801 B1 | 3/2003 | Rosenblum |
| 6,530,282 B1 * | 3/2003 | Kurtz et al. ............. 73/756 |
| 6,533,170 B1 | 3/2003 | Kit |
| 6,539,282 B2 | 3/2003 | Metcalf et al. |
| 6,556,889 B2 | 4/2003 | Rudick et al. |
| 6,564,121 B1 | 5/2003 | Wallace et al. |
| 6,581,798 B2 | 6/2003 | Liff et al. |
| 6,584,309 B1 | 6/2003 | Whigham |
| 6,588,548 B1 | 7/2003 | Dewitt |
| 6,594,549 B2 | 7/2003 | Siegel |
| 6,597,970 B1 | 7/2003 | Steury et al. |
| 6,611,810 B1 | 8/2003 | Kolls |
| 6,644,455 B2 | 11/2003 | Ichikawa |
| 6,648,153 B2 | 11/2003 | Holmes |
| 6,697,704 B2 | 2/2004 | Rosenblum |
| 6,711,460 B1 | 3/2004 | Reese |
| 6,711,465 B2 * | 3/2004 | Tomassi ............. 700/236 |
| 6,766,218 B2 | 7/2004 | Rosenblum |
| 6,814,255 B2 | 11/2004 | Liff et al. |
| 6,847,861 B2 | 1/2005 | Lunak et al. |
| 6,874,684 B1 | 4/2005 | Denenberg et al. |
| 6,877,655 B1 | 4/2005 | Robertson et al. |
| 6,892,041 B1 | 5/2005 | Shehata et al. |
| 6,892,941 B2 * | 5/2005 | Rosenblum ............. 700/237 |
| 6,973,369 B2 | 12/2005 | Trimmer et al. |
| 7,010,387 B2 | 3/2006 | Lantry et al. |
| 7,086,558 B1 | 8/2006 | Pixley et al. |
| 7,093,755 B2 | 8/2006 | Jordan et al. |
| 7,123,989 B2 | 10/2006 | Pinney et al. |
| 7,194,333 B2 | 3/2007 | Shoenfeld |
| 7,228,200 B2 | 6/2007 | Baker et al. |
| 7,264,136 B2 | 9/2007 | Willoughby et al. |
| 7,410,098 B2 | 8/2008 | Denenberg et al. |
| 7,444,203 B2 | 10/2008 | Rosenblum |
| 7,451,015 B2 * | 11/2008 | Mazur et al. ............. 700/239 |
| 7,469,820 B2 | 12/2008 | Rosenblum |
| 7,471,993 B2 | 12/2008 | Rosenblum |
| 7,490,054 B2 * | 2/2009 | Reade et al. ............. 705/16 |
| 7,537,155 B2 | 5/2009 | Denenberg et al. |
| 7,774,097 B2 | 8/2010 | Rosenblum |
| 7,783,378 B2 | 8/2010 | Pinney et al. |
| 7,787,986 B2 | 8/2010 | Pinney et al. |
| 7,857,161 B2 | 12/2010 | Pinney et al. |
| 2002/0139810 A1 | 10/2002 | Yuyama et al. |
| 2002/0166787 A1 | 11/2002 | Linton |
| 2003/0029882 A1 | 2/2003 | Yuyama et al. |
| 2004/0113786 A1 | 6/2004 | Maloney |
| 2004/0164146 A1 | 8/2004 | Rosenblum |
| 2004/0215369 A1 | 10/2004 | Rosenblum |
| 2005/0023286 A1 | 2/2005 | Pinney et al. |
| 2005/0049746 A1 | 3/2005 | Rosenblum |
| 2005/0192705 A1 | 9/2005 | Pinney et al. |
| 2006/0265102 A1 | 11/2006 | Bain |
| 2006/0272976 A1 | 12/2006 | Pinney et al. |
| 2007/0010910 A1 | 1/2007 | Pinney et al. |
| 2007/0162183 A1 | 7/2007 | Pinney et al. |
| 2007/0162184 A1 | 7/2007 | Pinney et al. |
| 2010/0268377 A1 | 10/2010 | Pinney et al. |
| 2011/0046778 A1 | 2/2011 | Pinney et al. |

FOREIGN PATENT DOCUMENTS

| | | |
|---|---|---|
| WO | WO-02/21402 | 3/2002 |
| WO | WO-2004/021289 | 3/2004 |
| WO | WO-2005/005266 | 1/2005 |

OTHER PUBLICATIONS

Request for Continued Examination (RCE) and Amendment as filed with the USPTO on Sep. 18, 2008 for U.S. Appl. No. 11/688,183.

Response as filed with the USPTO on Jan. 8, 2009 for U.S. Appl. No. 11/520,928.
Response as filed with the USPTO on Jan. 11, 2010 for U.S. Appl. No. 11/740,253.
Response as filed with the USPTO on Jan. 21, 2009 for U.S. Appl. No. 11/484,409.
Response as filed with the USPTO on Jan. 25, 2010 for U.S. Appl. No. 11/520,928.
Response as filed with the USPTO on Mar. 1, 2010 for U.S. Appl. No. 11/484,409.
Response as filed with the USPTO on Mar. 3, 2008 for U.S. Appl. No. 11/688,183.
Response as filed with the USPTO on Apr. 14, 2006 for U.S. Appl. No. 10/880,269.
Response as filed with the USPTO on Apr. 22, 2009 for U.S. Appl. No. 11/688,183.
Response as filed with the USPTO on Apr. 22, 2009 for U.S. Appl. No. 11/688,189.
Response as filed with the USPTO on May 1, 2009 for U.S. Appl. No. 11/520,928.
Response as filed with the USPTO on May 22, 2006 for U.S. Appl. No. 10/801,321.
Response as filed with the USPTO on May 27, 2008 for U.S. Appl. No. 11/688,183.
Response as filed with the USPTO on May 27, 2009 for U.S. Appl. No. 11/484,409.
Response as filed with the USPTO on Jul. 9, 2010 for U.S. Appl. No. 11/520,928.
Response as filed with the USPTO on Aug. 9, 2010 for U.S. Appl. No. 11/484,409.
Response as filed with the USPTO on Sep. 12, 2008 for U.S. Appl. No. 11/688,189.
Response as filed with the USPTO on Sep. 15, 2009 for U.S. Appl. No. 11/484,409.
Response as filed with the USPTO on Sep. 15, 2009 for U.S. Appl. No. 11/520,928.
Response as filed with the USPTO on Sep. 15, 2009 for U.S. Appl. No. 11/688,183.
Response as filed with the USPTO on Oct. 19, 2007 for U.S. Appl. No. 11/688,183.
Response as filed with the USPTO on Nov. 29, 2007 for U.S. Appl. No. 11/688,189.
Response as filed with the USPTO on Dec. 29, 2009 for U.S. Appl. No. 11/688,189.
US Advisory Action dated Aug. 25, 2010 for U.S. Appl. No. 11/484,409.
US Notice of Allowance dated Apr. 19, 2010 for U.S. Appl. No. 11/688,183.
US Notice of Allowance dated Aug. 19, 2010 for U.S. Appl. No. 11/520,928.
US Office Action dated Nov. 22, 2010 for U.S. Appl. No. 12/777,181.
Automed Efficiency Pharmacy™ R1000 product literature; published or in public use at least as early as Jun. 30, 2002; 2 pages.
Automed Efficiency Pharmacy™ R400 product literature; published or in public use at least as early as Jun. 30, 2002; 2 pages.
Automed Efficiency Pharmacy™ R600 product literature; published or in public use at least as early as Jun. 30, 2002; 2 pages.
Automed Efficiency Pharmacy™ R800 product literature; published or in public use at least as early as Jun. 30, 2002; 2 pages.
Automed® Technologies Quickfill product literature; published or in public use at least as early as Jun. 30, 2002; 1 page.
Automed® Fastpak™ Tabletop System product literature; published or in public use at least as early as Jun. 30, 2002; 2 pages.
Automed® Fastpak™ 330 and 520 product literature; published or in public use at least as early as Jun. 30, 2002; 4 pages.
Automed® Fastpak™ 71 System product literature; published or in public use at least as early as Jun. 30, 2002; 2 pages.
Automed™ Technologies ADDS (Automatic Drug Dispensing System) product literature; published or in public use at least as early as Jun. 30, 2002; 1 page.
Automed™ Technologies ATC™ Profile System product literature; published or in public use at least as early as Jun. 30, 2002; 2 pages.
Automed™ Technologies Automed Efficiency Pharmacy™ product literature; published or in public use at least as early as Jun. 30, 2002; 6 pages.
Automed™ Technologies Fastfill™ System product literature; published or in public use at least as early as Jun. 30, 2002; 2 pages.
Automed™ Technologies Optifill-II System product literature; published or in public use at least as early as Jun. 30, 2002; 4 pages.
Automed™ Technologies Quickfill Plus product literature; published or in public use at least as early as Jun. 30, 2002; 1 page.
Barker et al, White Paper on Automation in Pharmacy, The Consultant Pharmacists, 13(13):21-37, Mar. 1996.
CBS News, Automated Medicine, Nov. 13, 2001, available at http://www.cbsnews.com/stories/2001/11/13/health/printable317894.shtml.
Chains, Independents make some gains in technology, Drugtopics.com, Dec. 10, 2001, 3 pgs.
Declaration of Daniel Bain; executed Sep. 2004; 2 pages.
Declaration of Walter Bain including Exhibit A; executed Sep. 2004; 6 pages.
Docs try ATM-style prescription machines, CNN.com, Nov. 17, 2001, 2 pgs.
EP Office Action dated Sep. 24, 2009 for EP Application No. 05825427.7.
EP Office Action dated Oct. 13, 2009 for EP Application No. 04756405.9.
EP Search Report dated Jun. 22, 2006 for EP Application No. 04756405.9.
EP Search Report dated Jun. 29, 2009 for EP Application No. 05825427.7.
Express Scripts company literature; published or in public use at least as early as Jun. 30, 2002; 2 pages.
Fleming, Harris, Jr., Orderly Process—Can central prescription filling help solve pharmacy's time crunch? McKesson thinks it can, DrugTopics.com, Mar. 1, 1999, 3 pgs.
Foundation Systems Automated Prescription Point-of-Delivery Kiosk System product literature; published or in public use at least as early as Jun. 30, 2002; 1 page.
GSL Solutions Will-Call Storage Systems product literature; published or in public use at least as early as Jun. 30, 2002; 4 pages.
Innovation Associates PharmASSIST Robotic Dispensing Systems (RDS-I and RDS-II) product literature; published or in public use at least as early as Jun. 30, 2002; 2 pages.
Innovation Associates SmartCabinet System product literature; published or in public use at least as early as Jun. 30, 2002; 2 pages.
International Search Report and Written Opinion of the International Searching Authority dated Feb. 23, 2007 for PCT Application No. PCT/US05/43243.
International Search Report dated Mar. 10, 2005 for PCT Application No. PCT/US2004/020978.
Jackman, Michael, Study says chain drug stores ripe for kiosks, KioskMarketPlace.com, Aug. 1, 2001, 2 pgs.
Kieser, Joe, Medication available at punch of a button, Sun Newspapers, Oct. 31, 2001, 2 pgs.
Letter from Daniel T. Jones; dated May 15, 2001; 1 page.
Lewis et al, Developing The Infrastructure for Patient Care, The Patient-Centered Pharmacy, APhA, 2002, pp. 66-94.
McKesson ACCU Script™ Pharmacy Robot product literature; published or in public use at least as early as Jun. 30, 2002; 2 pages.
McKesson Accumed™ powered by Auto Link™ product literature; published or in public use at least as early as Jun. 30, 2002; 2 pages.
McKesson APS: Automated Will Call Rotary Cabinet, available at http://www.mckessonaps.com/wt/aps/prodserv_profiles_willcall.
McKesson Automated Will Call™ product literature; published or in public use at least as early as Jun. 30, 2002; 1 page.
McKesson Baker Cassettes™ product literature; published or in public use at least as early as Jun. 30, 2002; 1 page.
McKesson Baker Cells™ product literature; published or in public use at least as early as Jun. 30, 2002; 1 page.
McKesson Medcarousel™ product literature; published or in public use at least as early as Jun. 30, 2002; 2 pages.
MedVantx Point-of-Care Automated Sample System product literature; published or in public use at least as early as Jun. 30, 2002; 1 page.

Mendota Healthcare, Inc. Business Plan; Dec. 1, 2001; 36 pages.
Mendota Healthcare, Inc. Executive Summary; copyright 2001; 7 pages.
Mendota Healthcare, Inc.'s profile of InstyMeds available at www.instymed.com/video.html, 12 pgs.
Mentroy, Jill S., MD, FACS, Telepharmacy: VA Pharmacy finds Convenience in Vending Machines, Veterans Health System Journal (VHSJ), Oct. 6, 1998, 2 pgs.
NCR Fastlane™—The Self-Checkout Solution product literature; published or in public use at least as early as Jun. 30, 2002; 8 pages.
NCR Instymeds Prescription Medication Dispenser product literature; published or in public use at least as early as Jun. 30, 2002; 8 pages.
Parata Systems Parata RDS product literature; published or in public use at least as early as Jun. 30, 2002; 3 pages.
Pickpoint Corporation's profile of FlexCall product available at http://www.pickpoint.com/products-flexcall.html, 23 pgs.
PickPoint™ Flexrx™ Pharmacy Dispensing product literature; published or in public use at least as early as Jun. 30, 2002; 6 pages.
Pyxis Helpmate® SP product literature; published or in public use at least as early as Jun. 30, 2002; 2 pages.
Pyxis Medstation® 2000 product literature; published or in public use at least as early as Jun. 30, 2002; 1 page.
Pyxis Medstation® 3000 product literature; published or in public use at least as early as Jun. 30, 2002; 1 page.
Pyxis Supplystation® product literature; published or in public use at least as early as Jun. 30, 2002; 4 pages.
Rowland, Christopher, Drug Vending Units Worry Pharmacists, Jul. 3, 2004, 3 pages.
ScriptPro® Pharmacy Automation SP 100™ Robotic Prescription Dispensing System product literature; published or in public use at least as early as Jun. 30, 2002; 2 pages.
ScriptPro® Pharmacy Automation SP 200® Robotic Prescription Dispensing System product literature; published or in public use at least as early as Jun. 30, 2002; 2 pages.
ScriptPro® Pharmacy Automation SP Automation Center™ (SPace™) product literature; published or in public use at least as early as Jun. 30, 2002; 2 pages.
ScriptPro® Pharmacy Automation SP Central® Pharmacy Dispensing Management System product literature; published or in public use at least as early as Jun. 30, 2002; 1 page.
ScriptPro® Pharmacy Automation SP Station® product literature; published or in public use at least as early as Jun. 30, 2002; 2 pages.
ScriptPro® Pharmacy Automation SP Unit Dispenser™ (SPUD®) Robotic Pharmaceutical Dispensing System product literature; published or in public use at least as early as Jun. 30, 2002; 2 pages.
Telepharmacy Solutions, Inc. profile of TSI's ADDS (Automated Drug Distribution System) product available at http://www.telepharmaysolutions.com, 44 pgs.
Time to switch drugstores?, Consumer Reports, Oct. 2003, 5 pgs.
Ukens, Carol, Another automated dispenser hits community pharmacy, Drugtopics.com, Sep. 15, 1997, 3 pgs.
Ukens, Carol, Pharmacist Shortage Boosts Telepharmacy, Telepharmacy Solutions Media Coverage, Jun. 3, 2002, 2 pgs.
Ukens, Carol, Remote Control—Automation puts retail R.Ph.'s foot in doctor's door, Drugtopics.com, Jan. 20, 1997, 3 pgs.
Ukens, Carol, Technology—Rx vending machine targets pharmacy, Drugtopics.com, Dec. 10, 2001, 3 pgs.

US Advisory Action dated Mar. 18, 2008 for U.S. Appl. No. 11/688,183.
US Notice of Allowability dated Feb. 18, 2010 for U.S. Appl. No. 11/688,189.
US Notice of Allowance dated Jan. 27, 2010 for U.S. Appl. No. 11/688,189.
US Notice of Allowance dated Apr. 19, 2010 for U.S. Appl. No. 11/740,253.
US Notice of Allowance dated Jun. 14, 2006 for U.S. Appl. No. 10/880,269.
US Notice of Allowance dated Jul. 19, 2006 for U.S. Appl. No. 10/801,321.
US Office Action dated Jun. 8, 2010 for U.S. Appl. No. 11/484,409.
US Office Action dated Jan. 9, 2007 for U.S. Appl. No. 11/001,110.
US Office Action dated Jan. 9, 2008 for U.S. Appl. No. 11/688,183.
US Office Action dated Feb. 22, 2006 for U.S. Appl. No. 10/801,321.
US Office Action dated Mar. 15, 2006 for U.S. Appl. No. 10/880,269.
US Office Action dated Mar. 28, 2008 for U.S. Appl. No. 11/688,183.
US Office Action dated Apr. 2, 2009 for U.S. Appl. No. 11/520,928.
US Office Action dated Apr. 28, 2009 for U.S. Appl. No. 11/484,409.
US Office Action dated May 23, 2007 for U.S. Appl. No. 11/688,189.
US Office Action dated May 26, 2010 for U.S. Appl. No. 11/520,928.
US Office Action dated Jun. 13, 2008 for U.S. Appl. No. 11/688,189.
US Office Action dated Jun. 18, 2008 for U.S. Appl. No. 11/688,183.
US Office Action dated Jul. 19, 2007 for U.S. Appl. No. 11/688,183.
US Office Action dated Aug. 18, 2009 for U.S. Appl. No. 11/688,183.
US Office Action dated Aug. 19, 2009 for U.S. Appl. No. 11/484,409.
US Office Action dated Aug. 19, 2009 for U.S. Appl. No. 11/520,928.
US Office Action dated Sep. 12, 2006 for U.S. Appl. No. 11/001,110.
US Office Action dated Oct. 16, 2009 for U.S. Appl. No. 11/740,253.
US Office Action dated Oct. 22, 2008 for U.S. Appl. No. 11/484,409.
US Office Action dated Nov. 2, 2007 for U.S. Appl. No. 11/688,189.
US Office Action dated Nov. 21, 2005 for U.S. Appl. No. 10/801,321.
US Office Action dated Nov. 25, 2009 for U.S. Appl. No. 11/688,189.
US Office Action dated Dec. 1, 2009 for U.S. Appl. No. 11/484,409.
US Office Action dated Dec. 4, 2009 for U.S. Appl. No. 11/520,928.
US Office Action dated Dec. 12, 2008 for U.S. Appl. No. 11/520,928.
US Office Action dated Dec. 22, 2008 for U.S. Appl. No. 11/688,183.
US Office Action dated Dec. 22, 2008 for U.S. Appl. No. 11/688,189.
Vending Pharmacy—Is the long-distance dispensing of drugs the remedy for patients in remote areas?, Drugtopics.com, Mar. 6, 2000, 3 pgs.
Response to EP Examination Report filed on Aug. 9, 2011 for EP Application No. 05825427.7.
U.S. Office Action dated Sep. 12, 2011 for U.S. Appl. No. 12/861,634.
Response to CA Office Action filed on Sep. 2, 2011 for CA Application No. 2533754.
Response as filed with the USPTO on Mar. 18, 2011 for U.S. Appl. No. 12/777,181.
Canadian Office Action dated Mar. 7, 2011 for CA Application No. 2533754.
US Notice of Allowance dated Apr. 6, 2011 for U.S. Appl. No. 12/777,181.
Examination Report dated Apr. 12, 2011 for EP Application No. 05825427.7.

* cited by examiner

AUTOMATED VENDING OF PRODUCTS CONTAINING CONTROLLED SUBSTANCES

RELATED APPLICATIONS

This application is a continuation of U.S. patent application Ser. No. 11/740,253, filed on Apr. 25, 2007, which is incorporated herein by reference.

BACKGROUND OF THE INVENTION

1. Field of Invention

This invention relates generally to devices and methods for automating the distribution of regulated consumer products, in particular, pharmaceutical products that are regulated by the Drug Enforcement Agency (DEA), FDA, and other federal, state and local law enforcement organizations. More specifically, the invention relates to the automating the authorization, approval, and vending of products containing pseudoephedrine, making it easier for retailers to provide them directly to consumers under the current regulatory scheme. In some cases, this invention describes an automated capability for vending regulated products without contact between consumers and store personnel.

2. Background of the Invention

Recently, Congress passed the Combat Methamphetamine Epidemic Act (CMEA), in an attempt to address the diversion of pseudoephedrine-containing over-the-counter medicine products by drug dealers for use in manufacturing illegal substances. In implementing this law, the DEA has established constraints on the sale of products that contain pseudoephedrine and other chemicals. These constraints require pharmacies, drug stores, and convenience stores, among others, to validate the purchaser, regulate quantities, and maintain detailed logs of purchases. A consumer may only purchase certain limited amounts of pseudoephedrine in any one day, and/or over a one month time span, or other regulation-set time periods. In addition, certain states have regulations and laws that further regulate such sales. These regulations are designed to limit over the counter sales in an effort to reduce the amount of illegal substances that can be produced using pseudoephedrine as one of the essential ingredients. For retail establishments, implementing and complying with these new regulations as a business process can be expensive, tedious, and can force the business to spend significant amounts of labor time to ensure compliance with the various regulations, reducing the businesses' focus on their core processes. Not only do the retail locations spend significant time and resources implementing the required measures, but they also must keep detailed written records, such as logs, documenting each pseudoephedrine transaction. Therefore, there is a need to assist retail vendors of regulated products by limiting the cost and time required to properly and effectively comply with federal, local, or state regulations, particularly DEA regulations. In addition, manufacturers of over-the-counter medicine products containing pseudoephedrine (or other regulated products) need to effectively distribute their products within the regulatory framework so that their core business is preserved. Law enforcement agencies require effective analysis of purchasing data so that persons who divert such products to covertly manufacture illegal street drugs can be interdicted, in an effort to reduce the amount of pseudoephedrine containing products that are diverted into the illegal drug markets. And consumers who use these products lawfully need easier access, and more efficient methods of purchasing such regulated products.

A complicating factor is the diversity of regulations among the federal, state and local regions. For example, some states place an age restriction on purchasers and require that the retail vendor verify the purchaser's age. The DEA presently imposes a limit (expressed in milligrams of pseudoephedrine), which can be (and sometimes is) further limited by state or local regions. Some states further regulate the amount that can be purchased in any single day, or one month, periods of accounting.

The federal state and local agencies also need the ability to audit the log information to determine the retail store's compliance with applicable regulations. One way in which the regulations can be violated is for the lawbreaker to purchase over-the-counter pseudoephedrine products at a number of different stores, including those in different chains, and those in different regions, in an effort to avoid the daily or monthly limits. Thus, there is a need for an automated method of auditing the quantities purchased by anyone individual in local, state and federal jurisdictions.

U.S. Pat. No. 6,711,465 (Tomassi) disclosed vending machine systems and their associated methods of operation that are capable of verifying a consumer's identity. The vending machine systems include a card reader in conjunction with a biometric characteristic verifier that allows the device to verify a consumer's identity to assist in the purchase of regulated products, particularly cigarettes or alcohol. Tomassi disclosed vending embodiments capable of verifying whether the customer is old enough to purchase a product, but did not disclose methods for verifying compliance with other regulated parameters (such as cumulative purchase quantities), or methods of documenting a consumer's transaction. While Tomassi mentions pharmaceuticals, there are no methods disclosed for verifying whether the vending of pharmaceuticals would comply with applicable regulations, other than evaluating the age of the purchaser.

U.S. Published Patent Application US 2005/0192705 A1, filed by Pinney, et al, described an automated random access, random load storage and delivery unit capable of storing finished prescriptions and over the counter items. Pinney also described a communication network involving the random access, random load storage unit, a pharmacy management computer system, and a point of sale ("POS") system. Pinney, however, did not disclose methods or algorithms that can be used to authorize a purchase of a regulated product in compliance with set regulations to determine whether that consumer's ability to purchase the regulated product at that time is authorized under applicable regulations.

The present invention overcomes these and other deficiencies of the prior art by providing various devices and methods for vending regulated products, including those containing pseudoephedrine, by automating the procedures necessary to comply with the various state and federal regulations, and providing more efficient methods of delivering regulated products to consumers, providing access to such products, and automating the record keeping required by many regulations.

SUMMARY OF THE INVENTION

The present invention provides, in one aspect, methods for conducting a sales transaction by automating compliance with various state and federal regulations related to the sale of regulated products, such as pseudoephedrine. The method includes providing a consumer interface for receiving identification information from a consumer; prompting the consumer to select a regulated product; using the identification information and at least one product data derived from the regulated product to determine that the sales transaction complies with an applicable regulation governing the sale of the regulated product; and delivering the product to the consumer.

The present invention provides for in another aspect, storage and delivery devices that are capable of automatically, and without human intervention, implementing the identification and validation processes described herein, including devices for vending a regulated product, wherein the product itself, or a component thereof, is subject to a regulation governing its sale, comprising a housing that allows for the secure storage of regulated products; a plurality of storage locations for storing a plurality of regulated products; a consumer interface substantially affixed to the housing, which receives identification information from the consumer, and communicates information about a purchase transaction for a regulated product to the consumer; a means for accessing a database containing information about the consumer's previous purchases of the product itself, or the regulated component contained within the product, within a designated time period established by the regulation; a vending mechanism for delivering the product to the delivery point; a delivery point for allowing the consumer to retrieve the regulated product after it has been determined that the purchase transaction complies with the regulation.

In another embodiment, a counter-top machine, such as a kiosk or desk-top computer system, that contains a consumer interface and interactive software, is used to assist a retail location to validate the purchaser and quantity limitations, but relies on a retail employee to actually present the consumer product to the purchaser.

In still another embodiment, a centralized database is provided as a service to retail locations so that purchases of controlled products may be monitored across multiple locations, thus making for more efficient and widespread enforcement of the regulations. This service, whether belonging to a retail chain, a third party service provider, or a regulatory agency, aggregates transactions in a centralized database, and can interact with software to detect when purchasers distribute their purchases over multiple retail locations.

The present invention effectively reduces the resources that must be expended in retail locations to comply with various regulations, laws, or mandates of regulatory agencies, or state, federal, or local laws, and also more effectively implements effective counter measures against illegal purchases of regulated and controlled substances, and to ensure the effective limitation of these substances within reasonable limits required for normal consumption.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the following descriptions taken in connection with the accompanying drawings in which.

Figure 1:
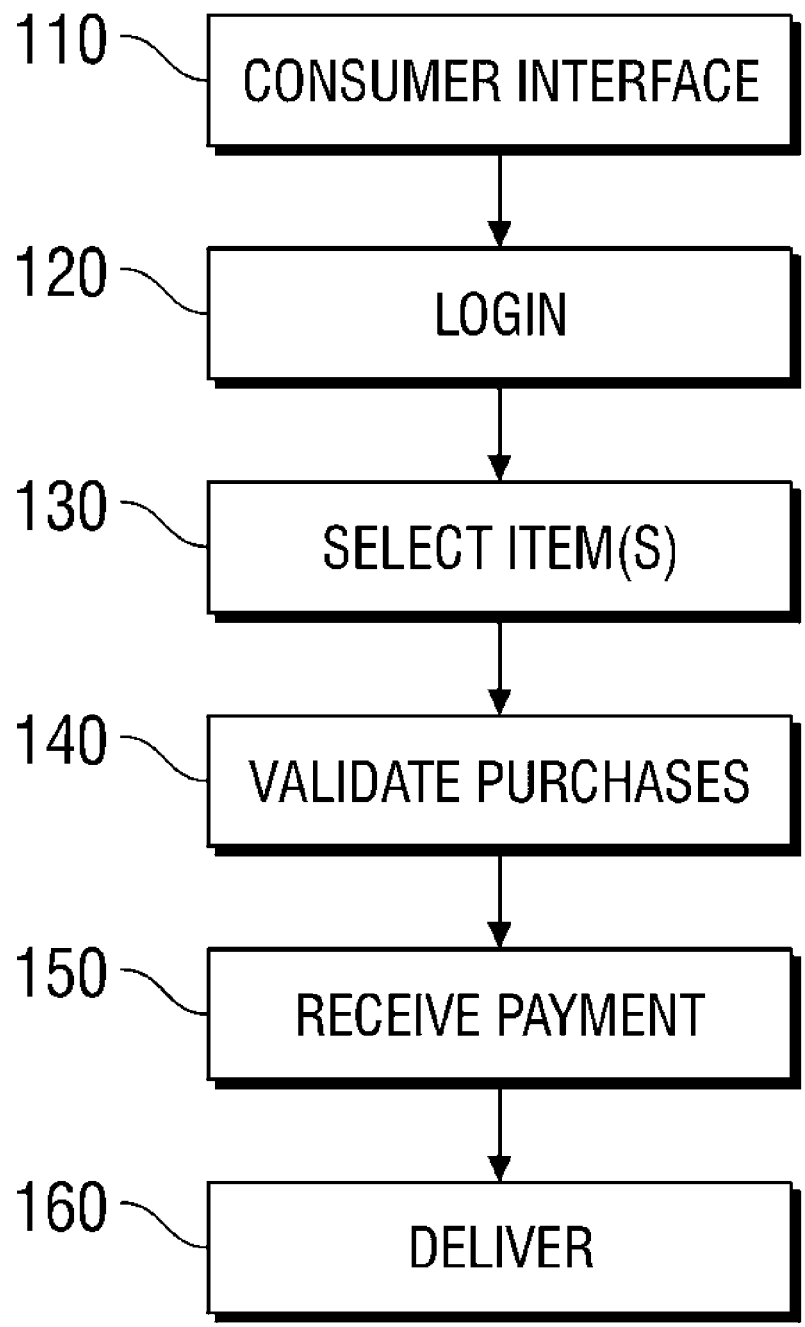
FIG. 1 describes a general process for implementing an embodiment of the invention.

Before any features of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "compromising" and variations thereof herein is meant to encompass the items listed thereafter and equivalents thereof as well as additional items. The use of numbers to identify elements of a method or process is simply for identification and is not meant to indicate that the steps should be performed in a particular order. It is appreciated that one of ordinary skill in the art will readily recognize that the disclosed embodiments are merely exemplary, and are not intended to limit the scope of the appended claims.

DETAILED DESCRIPTION OF EMBODIMENTS

The features and advantages of the invention, as well as the structure and operation of various embodiments of the invention, are described in detail below with reference to the accompanying FIGS. 1-20, wherein like reference numerals refer to like elements. Although the present invention is particularly suited for facilitating the authorization, verification, and delivery of controlled medications, it should be understood that the present invention may be embodied in many other forms, and to deliver many types of regulated products depending upon the size, shape, configuration, and regulations associated with the regulated product being sold.

Figure 2:
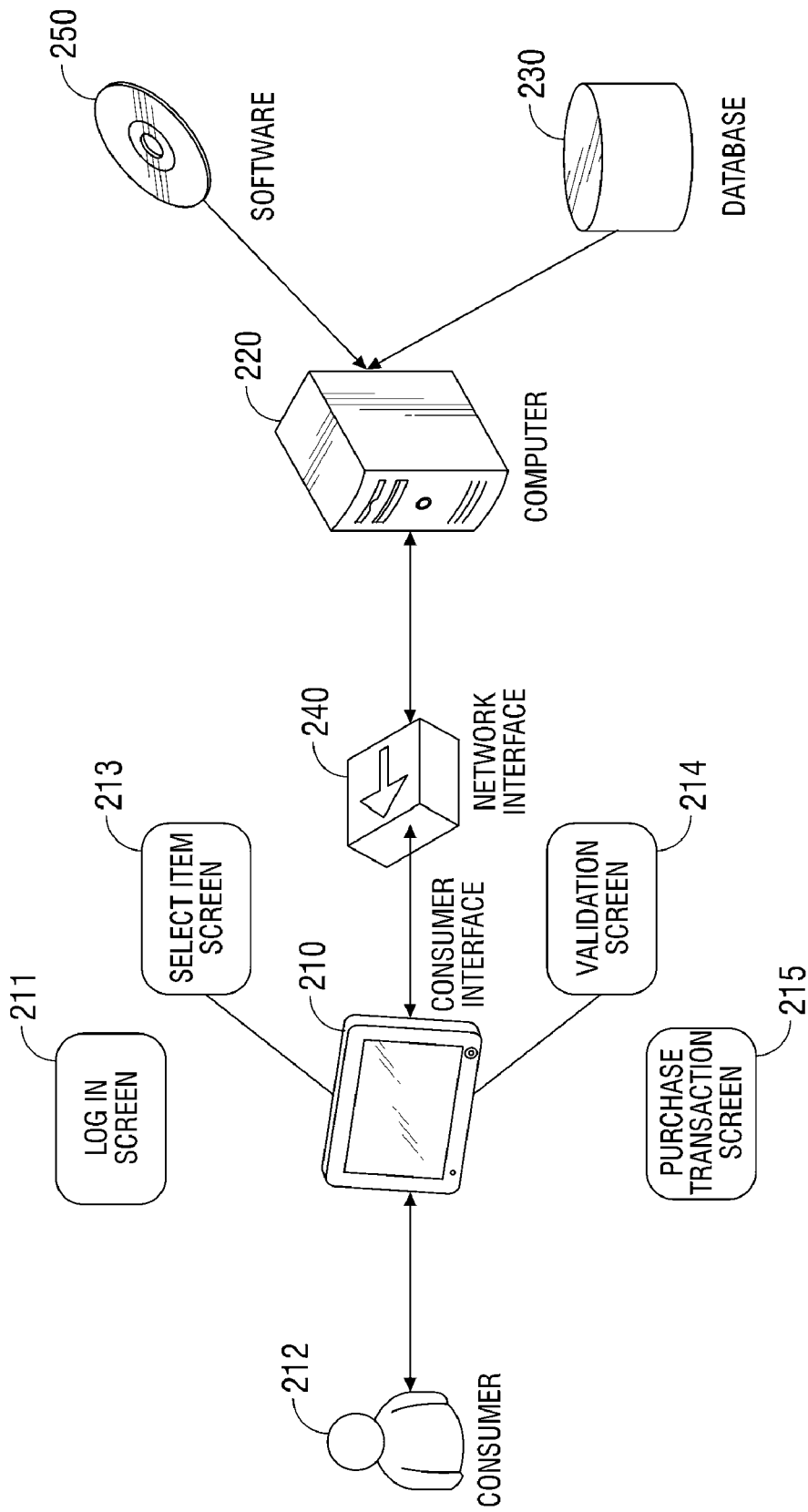
FIG. 2 illustrates a general network configuration for implementing an embodiment of the invention.

Referring to FIG. 1 and FIG. 2, one embodiment of the invention provides for a method for conducting a sales transaction for a controlled product comprising the steps of providing a consumer interface (110) allowing the consumer to identify himself/herself (120), allowing for the selection of a regulated product (130), validating the requested purchase transaction (140), receiving payment for the validated transaction (150), and delivering the regulated product to the consumer (160).

The regulated product may be any product subject to federal, state, or local limitations, including over-the-counter medications (e.g. pseudoephedrine containing products, birth control products, etc.), tobacco products, alcohol, firearms, ammunition, spray paint, volatile solvents or chemicals, etc. The product may be regulated for any number of reasons or based on a number of different criteria, such as the purchaser must be a certain age to consume the product, only a certain number of the regulated products may be purchased in any given time period or time periods, only a certain amount of a component of the regulated product, such as a chemical or the active pharmacological ingredient, may be purchased in any given time period or time periods. Thus, data about the regulated product (or various components or constituents thereof) the consumer desires to purchase is necessary to determine whether a product purchase complies with any applicable regulation. Such data may include the identity of the regulated product, the identity of the active ingredient, the identities of the chemicals comprising the regulated product, the quantity of any ingredient, chemical component, or active pharmaceutical ingredient included in the regulated product or products that the consumer desires to purchase.

Alternatively, the products may also be products in which limiting criteria may be applied by the retailer, or products in which the retailer wishes to limit sales.

The CMEA specifically limits the sales of certain chemicals, including ephedrine, pseudoephedrine, and phenylpropanolamine. It is understood that these regulated chemicals are used in their broadest sense, and would include all salts, optical isomers, and salts of optical isomers of such chemicals. Pseudoephedrine is commonly found in over-the-counter cold medicines. The amount of pseudoephedrine that an individual can purchase each month is limited and individuals may be required to present photo identification to purchase products containing pseudoephedrine. In addition, stores are required to keep personal information about purchasers for at least two years. For example, the CMEA currently limits retail sales of these chemicals to 9.0 grams per customer during a 30-day period, and no more than 3.6 grams per day.

As illustrated in FIG. 2, the consumer interface (210) is in communication with a computer (220). In some embodiments, the consumer interface displays information which may be received from the computer, such as various prompts, fields, forms, menus, characters or the like which may be used to facilitate a sales transaction. The displayed information may take virtually any form, and can include words, sentences, web-like interfaces, virtual shopping carts, or other similar visual displays of information that enable and facilitate the exchange of information between the consumer and the store, or in some embodiments, the consumer and a vending device. The consumer interface must also allow the consumer to provide data inputs, through use of various prompts, fields, menus, keystrokes, various data readers (e.g. card readers, OCR readers, RFID readers, etc) or the like, so that the consumer may provide certain identifying information, such as his/her identity, date of birth, biometric data, transaction information, age, or unique identifying information such as a PIN, Social Security Number, driver's license number, or military identification, etc.

Figure 3:
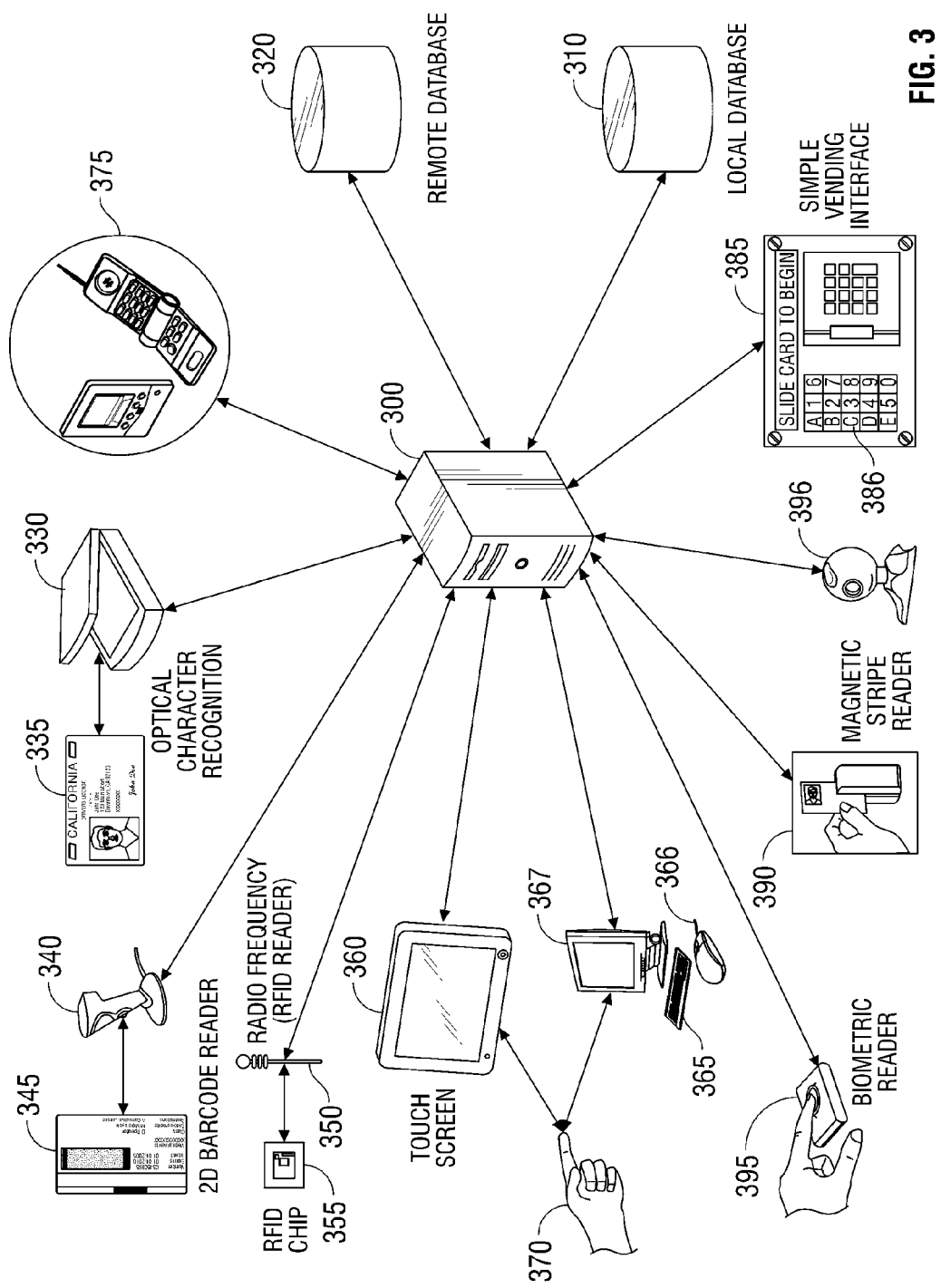
FIG. 3 illustrates various components that may be associated with or included as part of the consumer interface.

If a display is incorporated into the consumer interface, it may take a number of different forms, including a CRT or monitor (367) or touchscreen (360) capable of displaying various screens that convey pertinent transaction information related to the sale of a regulated product, including a log-in screen (211), a screen notifying the consumer that the inputted log-in information has been accepted, a screen facilitating the consumer's selection of a regulated product (213), a screen facilitating the validation of the consumer's request to purchase the desired controlled product to ensure compliance with applicable laws (214), and a screen to facilitate the purchase transaction (215). Alternatively, the display may be a simple LCD (385) that can display one or more lines of text. Alternatively, the consumer interface may allow the consumer to view information, make product selections, or otherwise pursue a transaction by interfacing with the consumer's wireless phone or PDA (375). The above transaction information may be communicated or inputted using a number of different methods and devices, as illustrated in FIG. 3. The consumer interface (210) may take many forms, and by way of example, may include one or more of the following devices to facilitate data exchange and or communication with the computer: a touch screen (360), display, keyboard (365), mouse (366), monitor (367), an LCD panel capable of displaying one or more lines of text (385), a card reader capable of reading magnetically coded data (390), a keypad (386), an optical character recognition device (330), a 2D barcode reader (340), an RFID reader (350), a biometric reader (e.g. fingerprint reader, retinal scanner) (395), scanner, camera (396), or a wireless interface capable of interfacing with a wireless device, such as a PDA or phone (375). In addition, the consumer interface may also contain various payment receiving devices, such as a cash acceptor, credit card or debit card reader (1450), an RF speed pass reader, and the like, as well as a electronic signature pad (1460).

Figure 15:
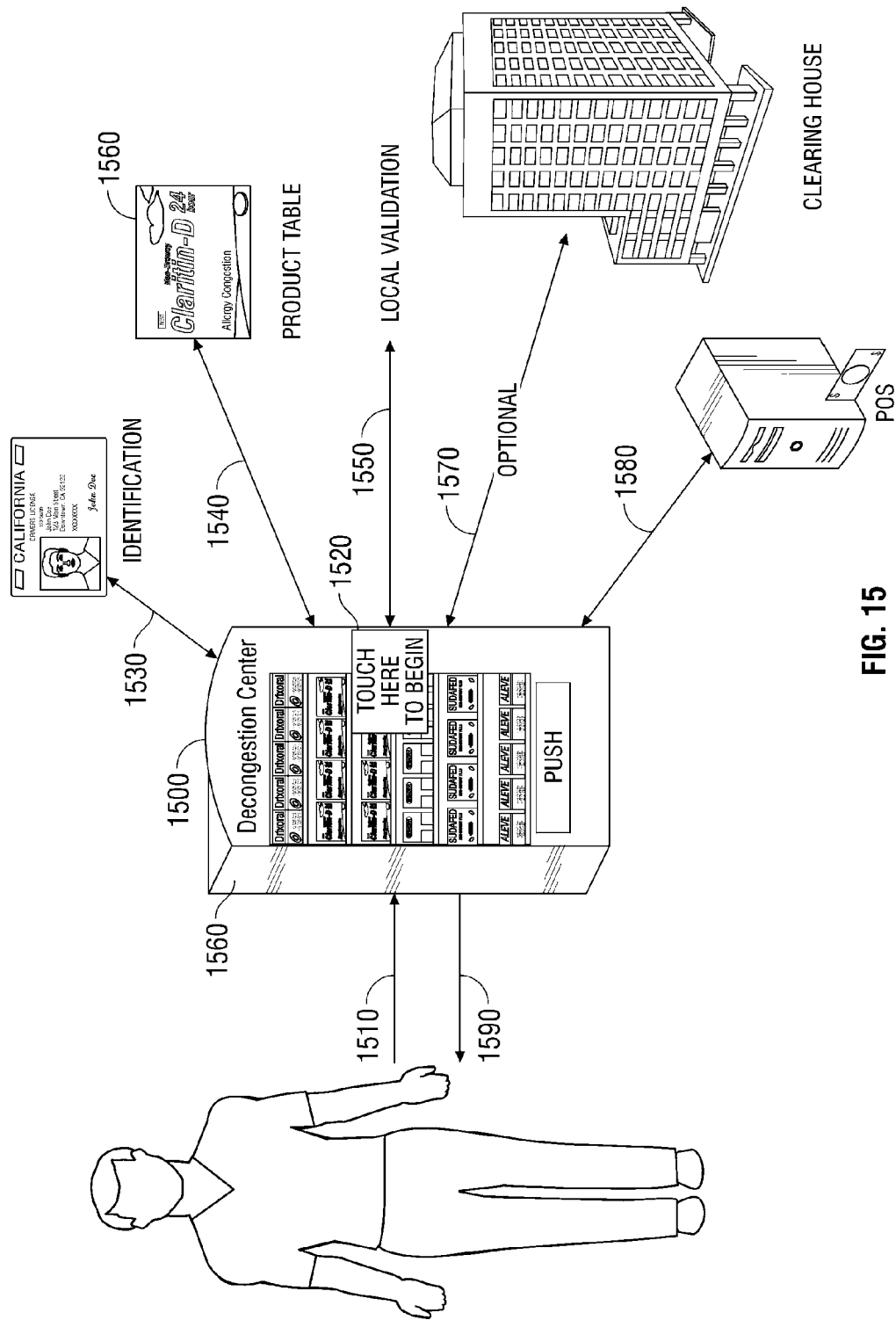
FIG. 15 illustrates a vending device embodiment.

The consumer interface (210) is connected to, or in communication with a computer (220), however it is not necessary for the consumer interface and computer to be physically connected. The computer may be remotely located and communicate with the consumer interface via a network connection or interface (240), including a wireless (CDMA, GSM, Bluetooth, or the like) interface, or even a wired connection (USB, PCI, Ethernet or other form of wired connection). The consumer and/or computer interface may also be physically connected to or located on a storage and delivery device, such as a vending apparatus (1580) (as illustrated in FIG. 15) or the consumer interface (210) and/or computer (220) may be included or incorporated as part of a kiosk (FIG. 17) that provides additional functionalities or information to the consumer.

To the extent that consumer interface (210) is connected to, or associated with, a vending apparatus, the invention is not limited to any particular configuration, method of delivering stored items, or makes or models of vending apparati. Helical coil machines will work, as will more sophisticated devices. Devices that are well-suited for use in conjunction with the present invention include the random access and random load delivery units described in U.S. Pat. No. 7,123,989, issued to Pinney et al, and United States Patent Application Publication No. US 2005/0192705, both of which are incorporated herein by reference in their entirety. Other vending embodiments, particularly those useful for storing and delivering medications, such as the devices disclosed in U.S. Pat. No. 6,892,941 issued to Rosenblum, or U.S. Pat. No. 6,464,142, issued to Denenberg will also work, and both are incorporated by reference in their entirety. The device disclosed in U.S. Pat. No. 7,086,558, issued to Pixley, will also work with the methods described herein, and this patent is also incorporated herein by reference in its entirety.

The computer (220) contains or is capable of accessing software (250) that implements a series of rules, comparisons, or algorithms to determine whether the purchaser is qualified to make the purchase he/she desires, under applicable state and federal regulations, such the CMEA, which is incorporated herein by reference. The algorithms are particularly designed to analyze the consumer's previous purchase history of the regulated product over a certain time period or time periods, or analyzing historical purchases by the consumer in specific geographic areas. By way of example, the software implements a series of algorithms to determine whether the purchaser meets minimum age requirements, or maximum purchase quantities over a pre-specified timeframe, or similar requirements mandated by applicable regulations. The algorithms are preferably designed to implement applicable regulations, laws, or guidelines set by local, state, or federal agencies, but also may be based on other pre-set criteria to implement a particular objective, whether legal, commercial, or otherwise.

The computer may also include or access a database (230), which may contain information or data pertinent to the transaction, such as the quantity of regulated substances purchased by the consumer in the last month, criminal history, whether the consumer's identification is correct, etc. The database (230) is capable of interacting with the software such that the software may call upon the database for information pertinent to the transaction. The database (230) may be located in the computer, or in the store's local area network (1410). However the database (230) need not be located within the computer or a local area network, but may be remotely located and accessible by the computer through various communication interfaces and methods known to those skilled in the art (1420).

Returning to FIG. 1, the software may facilitate the consumer identification step (120), the selection step (130), the validation step (140), and depending upon the embodiment, may be associated with the payment (150) and delivery (160) steps.

To begin a purchase transaction, the consumer first engages the consumer interface (210), where the consumer is required to identify himself/herself. Several different consumer identification procedures may be used, which will generally be referred to as log-in processes (220).

Figure 4:
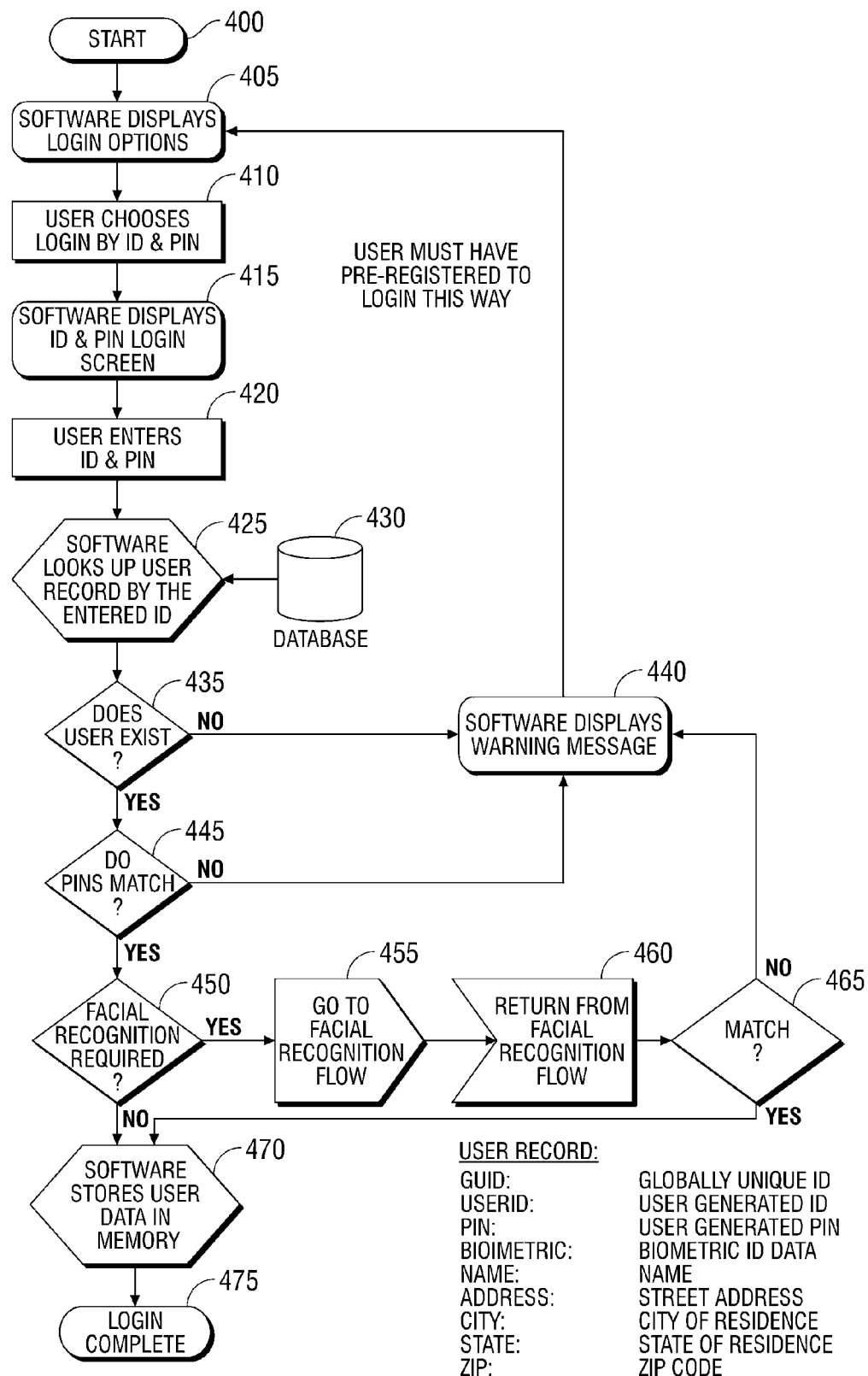
FIG. 4 describes a login process embodiment which considers pre-registered ID & PIN methods for identifying the consumer.

FIG. 4 describes a login process that utilizes an ID and PIN to identify the consumer. The process starts in step 400. In step 405, the consumer accesses the consumer interface, and login options are displayed to the consumer for the consumer's selection. In step 410, the consumer chooses one of the options. In step 415, software (250) may display empty boxes where the consumer can input his/her identification (ID), such as a User Name, and personal identification number (PIN), either directly using a text-inputting device, an interactive voice response (IVR) interface, touchpad, keyboard, virtual input system, or the like on a login screen presented to the consumer. In step 420, the user enters the ID and corresponding PIN. In step 425, the software (250) interfaces with a database 430. The database 430 can be local or remote or a combination of local and remote, depending on the embodiment. The software directs the database 430 to look up the user record based on the ID that was entered in step 415. A database 430 of user IDs and PINS is maintained for the purpose of step 425.

In step 435, the software (250) determines whether the user exists as noted within the database 430. If so, control passes to step 445, otherwise control moves to step 440. In step 440, the software displays a warning message to the user concerning the lack of a valid ID, and passes control back to step 405. In step 445, the PIN entered by the user is compared to the PIN in the record found in the database 430 for that ID; if there is no match, control is transferred to step 440, otherwise control is transferred to step 450.

In step 450, the software checks whether facial recognition is required. If not, control passes to step 470, otherwise to step 455. In step 455, the software proceeds to invoke a facial recognition flow process as an embedded function within the software. One facial recognition process is described in FIG. 10, and below. When control is returned from the facial recognition flow process in step 460, control passes to step 465. Step 465 determines whether the facial recognition function has identified a match with the consumer's face, and if so, control passes to step 470, otherwise to step 440. In step 470, the software stores the user data in memory. In step 475, the login process has been successfully completed.

Figure 10:
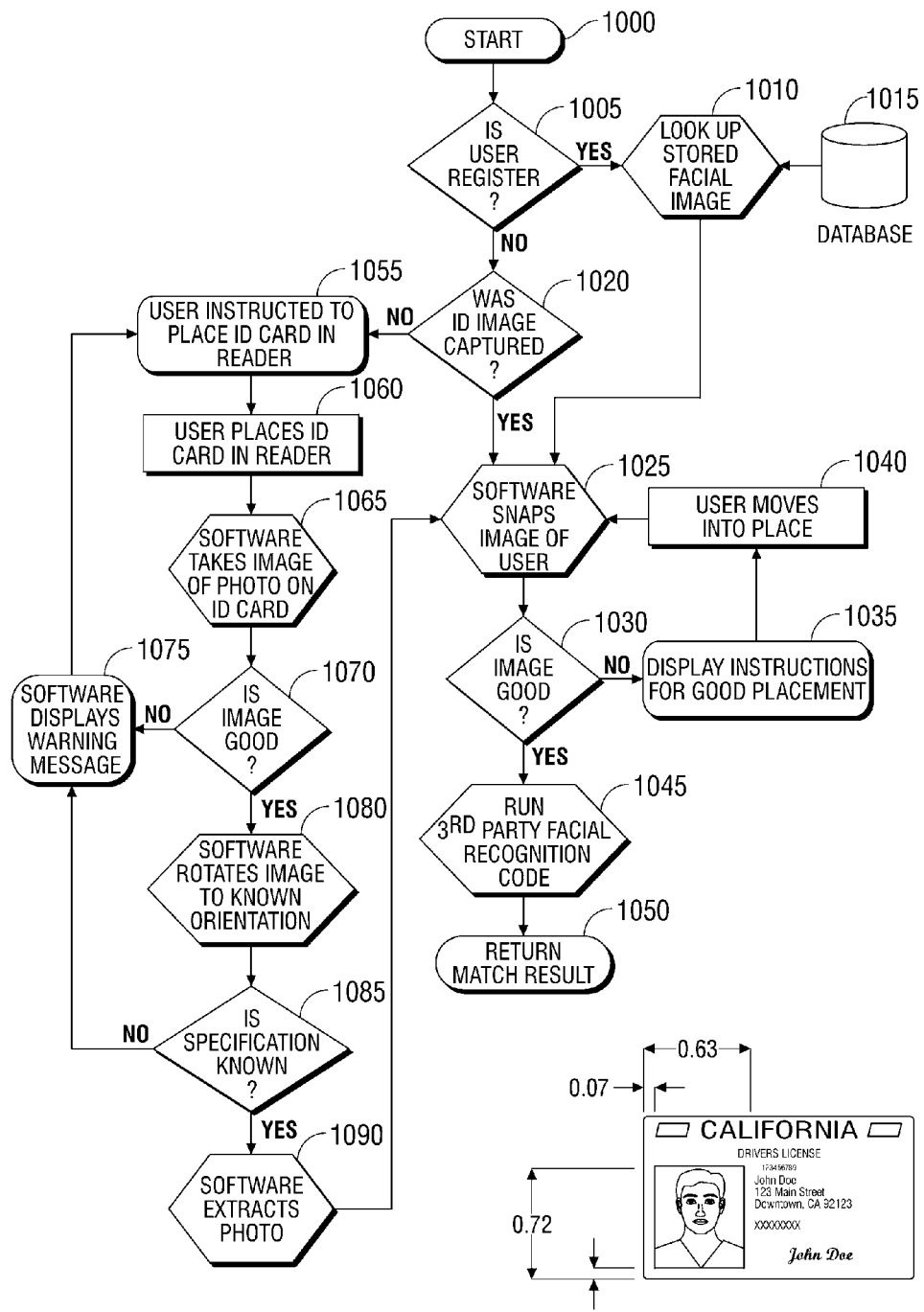
FIG. 10 describes a facial recognition process that may be utilized during a log in process.

FIG. 10 illustrates one facial recognition process. In step 1005, the software checks to see if the user is registered, and if so, step 1010 looks up the stored facial image for that consumer in a database 1015. The stored photo may be from a previous visit to the store and may be taken by a camera included as part of the consumer interface, or the stored photo may be copied from an identification card, such as a driver's license. Alternatively, the computer could access the network, and access a stored photograph from a central database, such as the DMV or even federal criminal databases. At step 1025, the software directs the camera to take an image of the consumer. In step 1030, the consumer's image is checked for quality, and if the image is not good, step 1035 displays instructions to the consumer to ensure that his/her face is correctly photographed. In this case, the consumer moves into place in step 1040, whereupon control is returned to step 1025. If the image is good, a facial recognition procedure is executed in step 1045, and step 1050 returns the match result. Commercial facial recognition algorithms and software are available, and can be implemented within software (250) by methods known to persons of skill in the art, or by utilizing facial recognition software that is commercially available.

In step 1020, the software checks if the ill image was captured. If so, control transfers to step 1025, otherwise control moves to step 1055 where the consumer is instructed to place the ill card in the reader. In step 1060, the user complies by placing the ill card in the reader, and the software takes an image of the photo on the ill card in step 1065. In step 1070, the software determines whether the image is good, and if so, the software rotates the image to a known orientation in step 1080, otherwise the software displays a warning message in step 1075 and transfers control to step 1055.

In step 1085, the software checks whether the specification for the particular identification is known, i.e., for that particular identification, does the software have the necessary data to properly locate the photo, and the proper dimensions of that photo so that the software may fully extract it in order to perform the necessary facial recognition comparison. Thus, the "specification" refers to the image of the license on FIG. 10B showing precisely where the photo is located on the license. If the specification is known, the software extracts the photo in step 1090 and transfers control to step 1025, and if not, control is transferred to step 1075.

Figure 5:
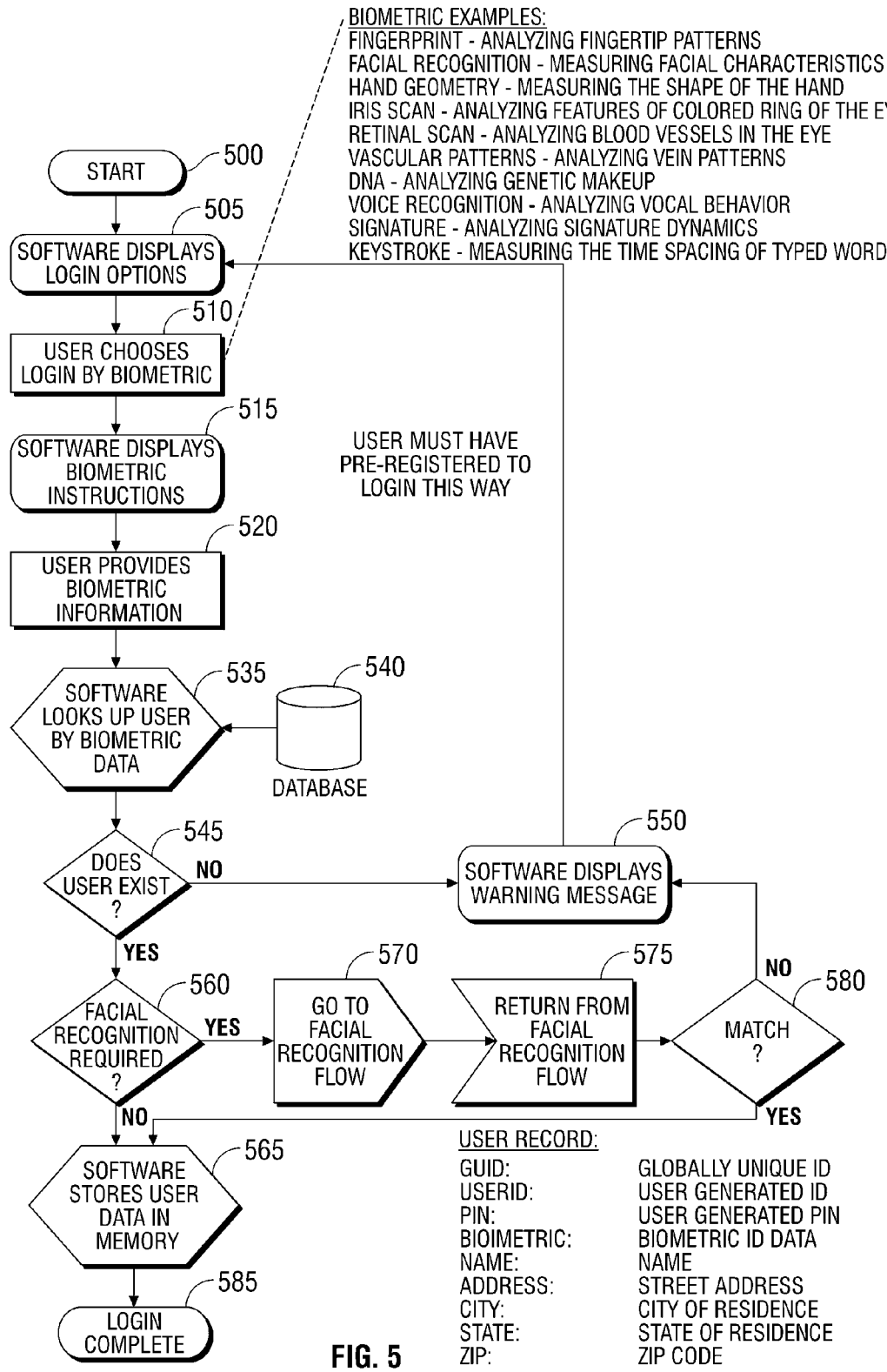
FIG. 5 illustrates a biometric login process embodiment.

FIG. 5 illustrates a biometric login process that may be used instead of, or in conjunction with any of the disclosed log in processes. In step 500, the login process is started. In step 505, the software displays a variety of login options to the user. In step 510, the user chooses to be logged in by biometric means. Step 515 displays the biometric login instructions for the user's information. In step 520, the user provides the required biometric information, such as a fingerprint, retinal scan, or other unique characteristic. To accomplish the necessary transfer of biometric information, a corresponding biometric detector is associated with the consumer interface, such as a fingerprint scanner, digital face recognizer, or retinal scanner, which can allow the system to compare the biometric data with data on file to assist in accurately identifying the consumer.

Depending upon the biometric used in the process, the process may optionally require the user to enter a PIN. For example, fingerprint scanners have some potential for false positives. To prevent this, a PIN may be required to confirm that the fingerprint identification matches the actual user, as the likelihood of misidentifying the consumer with this multiple data is extremely remote. For other biometrics, such as DNA analysis, a PIN will likely not be required, due to the accuracy and low chance of false positives.

The software looks up the user by biometric data in a database 540 in step 535. In step 545, the invention checks whether the user exists in the biometric database; if not, control passes to step 550. In step 550, the software displays a warning message to the user, and passes control to step 505.

Optionally, before passing control to step 560, if the identification method utilizes both a biometric and a PIN, the process will optionally determines whether the entered PIN matches the PIN in the biometric database 540; if so, control is passed to step 560, otherwise to step 550. In step 560, the invention determines whether facial recognition is required— if so, control passes to step 570, otherwise to step 565. In step 565, the software stores all login data in memory and passes control to step 585. In step 585, the login process has completed successfully. Step 570 initiates an embedded facial recognition function, as described above and in FIG. 10, and waits for a response. In step 575, a response is received from the facial recognition function. In step 580, the response from the facial recognition function is either a "match" or "no match" (or see description of 465); if there is a match, control passes to step 565, otherwise to step 550.

Figure 6:
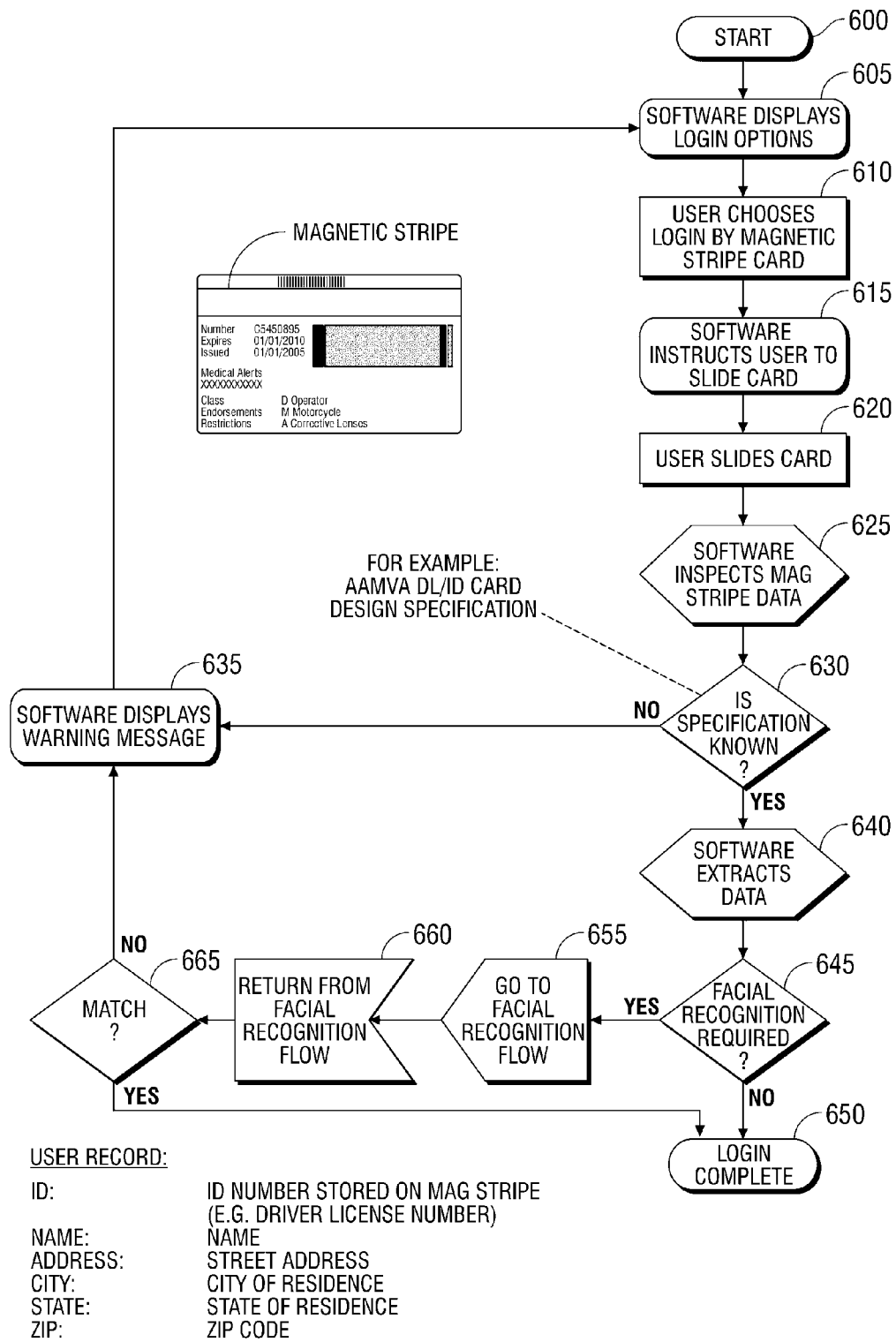
FIG. 6 describes a login process embodiment which uses magnetic stripe card to log the user m.

FIG. 6 describes a login process that uses magnetic stripe card to log the user in. The process begins in step 600. In step 605, the software displays login options to the user. In step 610, the user chooses to log in by using a magnetic strip card. In step 615, the software instructs the user to slide the magnetic stripe card through the card reader. To input the identification data (620), the consumer may interface with a card reader to electronically read information from an identification card, such as a driver's license, military identification card, retailer identification card or the like. In step 625, the software inspects the magnetic stripe card data provided by the user. In step 630, the software determines whether the data specified on the magnetic stripe card as read is a known specification of a user; if the specification is unknown, control passes to step 635, otherwise to step 640. In step 635, the software displays a warning message to the user about the magnetic stripe card data, and control is passed to step 605.

In step 640, the software extracts data from the magnetic stripe card. In step 645, the software checks to see if facial recognition is required; if so, control passes to step 655, otherwise control passes to step 650. In step 650, the login has been successfully accomplished and the process is complete.

In step 655, an embedded facial recognition function is invoked to identify the user visually, as described above and in FIG. 10. In step 660, the embedded facial recognition function returns control to the login process. In step 665, the software determines if the facial recognition function has matched the user—if so, control passes to step 650, otherwise control is passed to step 635.

Figure 7:
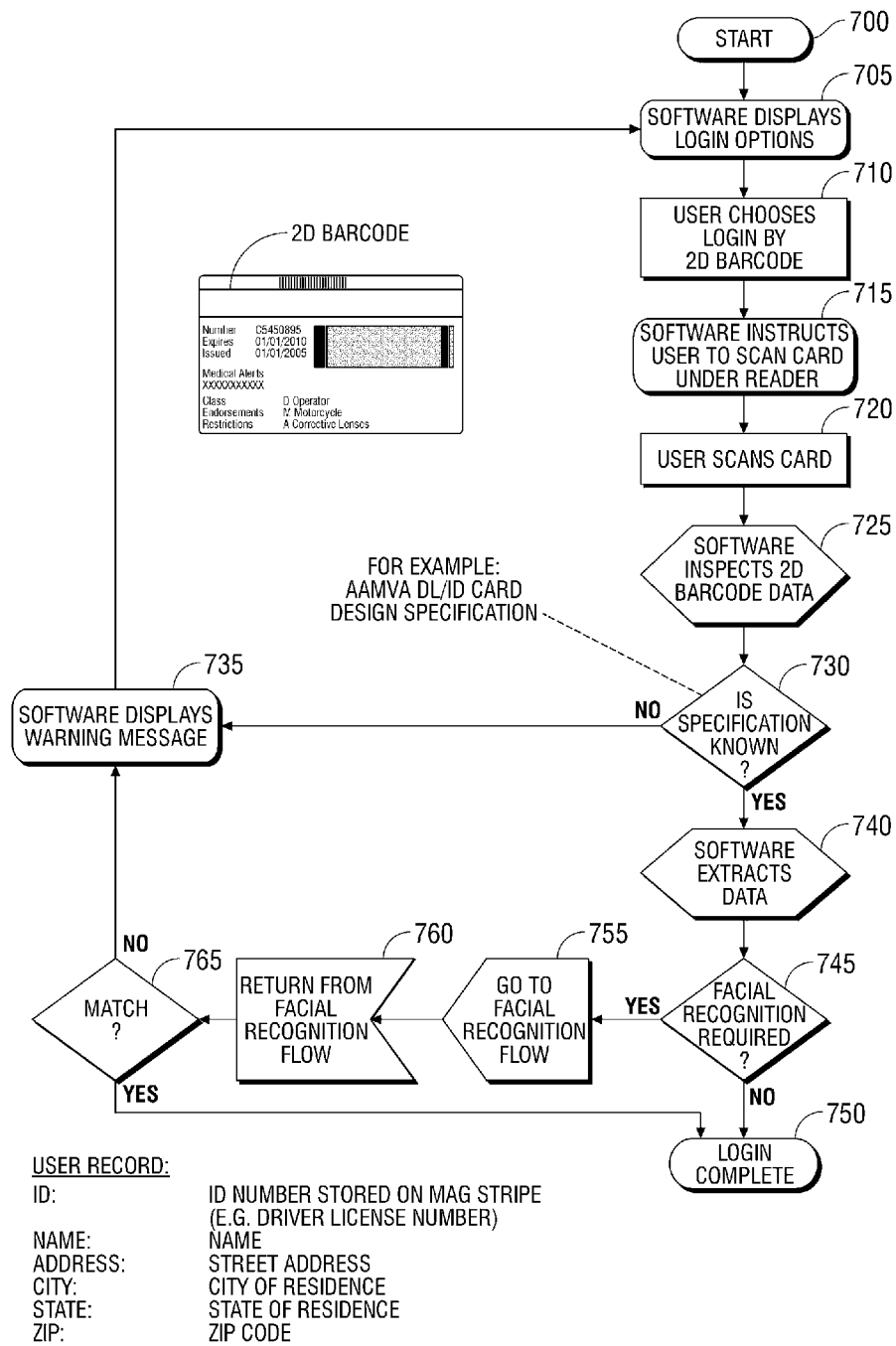
FIG. 7 shows a login process embodiment by which a user can login by means of a 2D barcode.

FIG. 7 shows a process by which a user can login by means of a 2D barcode. The process starts in step 700. In step 705, the software displays login options to the user. In step 710, the user selects to login using a 2D barcode. In step 715, the software instructs the user to scan the card under the 2D barcode reader. The user scans the card in step 720. In step 725, the software inspects the 2D barcode data as scanned. In 730, the software determines whether the 2D barcode specification is known; if so control transfers to step 740, otherwise control proceeds to step 735.

In step 735, the software displays a warning message to let the user know that the 2D barcode data is not a known specification. Control is then transferred to step 705. In step 740, the software extracts data from the barcode. Step 745 checks to determine whether facial recognition is required; if so, control proceeds to step 755, otherwise to step 750. If facial recognition is required (745, the facial recognition process described above and illustrated in FIG. 10 may be implemented (755).

In step 755, the embedded facial recognition function is initiated, and the process waits for a response. In step 760, the response is acquired from the embedded facial recognition function. Step 765 checks to determine whether a match has been found using the facial recognition function; if not is passed to step 735. If a match has been found, or if no facial recognition is required, control is passed to step 750, and the login process has been successfully completed.

Figure 8:
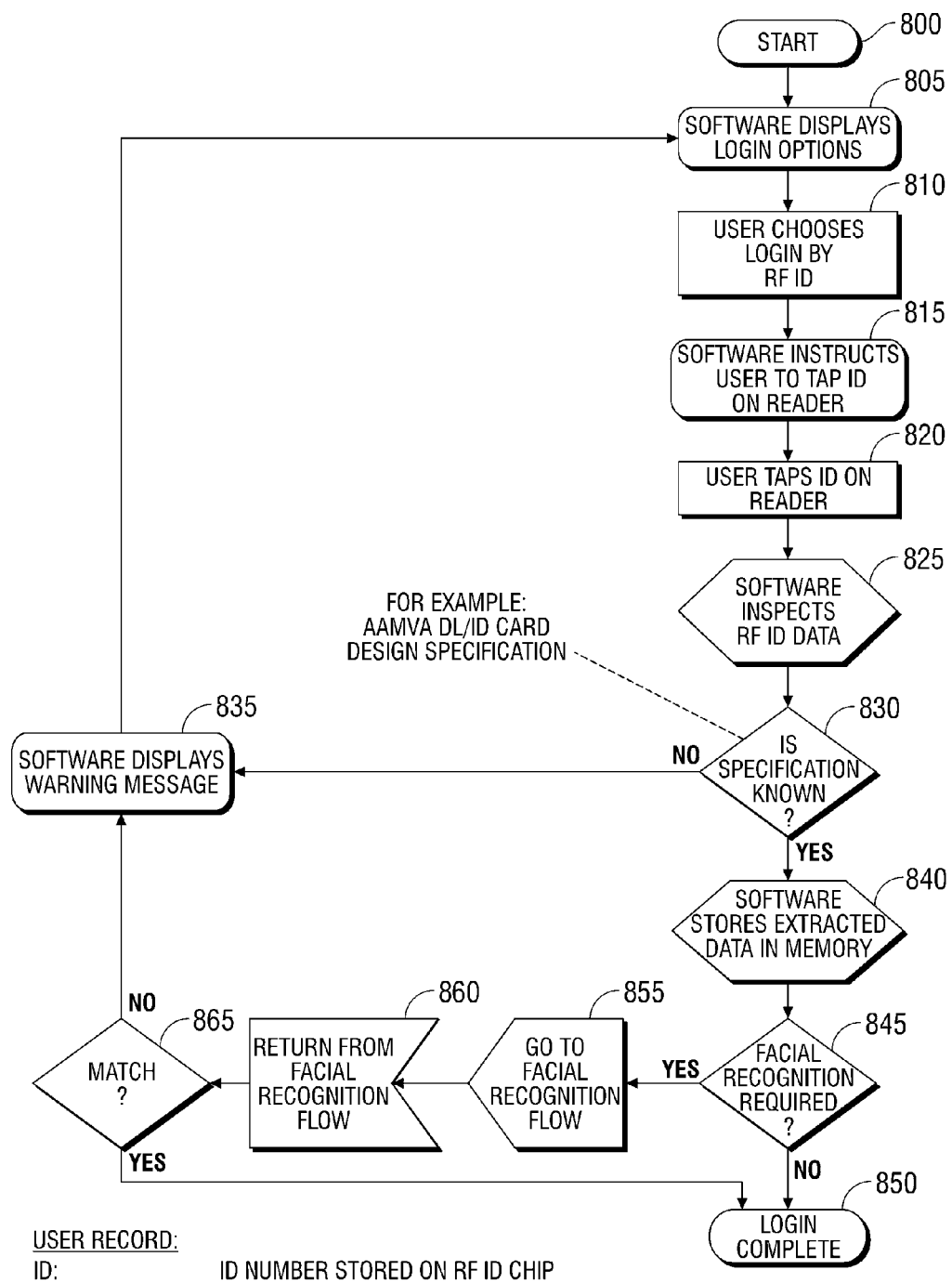
FIG. 8 describes a login process embodiment based on an RFID device.

FIG. 8 describes a login process embodiment based on an RFID device. In step 800, the login process begins. IN step 805, the software displays a variety of login options. In step 810, the user chooses to login using the RFID option. In step 815 the software instructs the user to tap the ID on the reader. The user complies in step 820, and in step 825, the software inspects the RPID data read from the RFID device reader. In step 830, the software determines whether the RPID data specification is known to the system, and if so, control proceeds to step 840, otherwise to step 835. In step 835, the software displays a warning message to the user and transfers control to step 805.

In step 840, the software stores extracted data into memory for later use. In step 845, the process checks to see if facial recognition is required; if so, control is transferred to step 855, otherwise to step 850. In step 850, the login process has been completed successfully. If facial recognition is required (845), a facial recognition process described above and illustrated in FIG. 10 may be implemented (855). In step 860, a response is received from the embedded facial recognition process. Step 865 checks to determine whether the embedded facial recognition process has matched the purchaser's face with the anticipated data; if not control passes to step 835. If a match has been found, or if no facial recognition is required, control is passed to step 850, and the login process has been successfully completed.

Pursuant to the Combat Methamphetamine Epidemic Act (CMEA), a number of forms of identification may be accepted by a retailer, including: United States passport (unexpired or expired); Alien Registration Receipt Card or Permanent Resident Card, Form 1-551, an unexpired foreign passport that contains a temporary 1-551 stamp; an unexpired Employment Authorization Document issued by the Immigration and Naturalization Service which contains a photograph, including Form 1-766; Form 1-688, Form I-688A, or Form I-688B; in the case of a nonimmigrant alien authorized to work for a specific employer incident to status, an unexpired foreign passport with an Arrival-Departure Record, Form 1-94, bearing the same name as the passport and containing an endorsement of the alien's nonimmigrant status, so long as the period of endorsement has not yet expired and the 14 proposed employment is not in conflict with any restrictions or limitations identified on the Form 1-94; Native American tribal documents; United States Coast Guard Merchant Mariner Card; Driver's license issued by a Canadian government authority. In addition, for individuals 16 years of age or older, retailers may accept a driver's license or identification card containing a photograph, issued by a State or an outlying possession of the United States. If the driver's license or identification card does not contain a photograph, identifying information shall be included such as: name, date of birth, sex, height, color of eyes, and address. Retailers may also accept a school identification card with a photograph, voter registration card, U.S. military card or draft record, an identification card issued by Federal, State, or local government agencies or entities. If the identification card does not contain a photograph, identifying information shall be included such as: name, date of birth, sex, height, color of eyes, and address, military dependent's identification card. For individuals under age 18 who are unable to produce a document from the list above of acceptable documents for persons age 16 years and older, retailers may accept school record or report card, clinic doctor or hospital record, daycare or nursery school record.

The various forms of identification may optionally include biometric data, which may be analyzed to confirm that the person inserting the identification information matches the information contained on the identification. That is to say, the consumer and the identification card match, thereby confirming that the consumer seeking to purchase the regulated products is the person whose purchase history is being analyzed. The biometric data on the card may be read through the OCR.

Many of these forms of identification do not have an electronic means of storing the information. In most cases, a state issued driver's license will. However, not all states have completely migrated to standard DL/ID-2000 set by the American Association of Motor Vehicle Administrators ("AAMVA"). Additionally, even for the states that have migrated they often do not issue new cards when a license is renewed. Thus, many individuals may be carrying a card without electronic data storage.

Figures 9A, 9B:
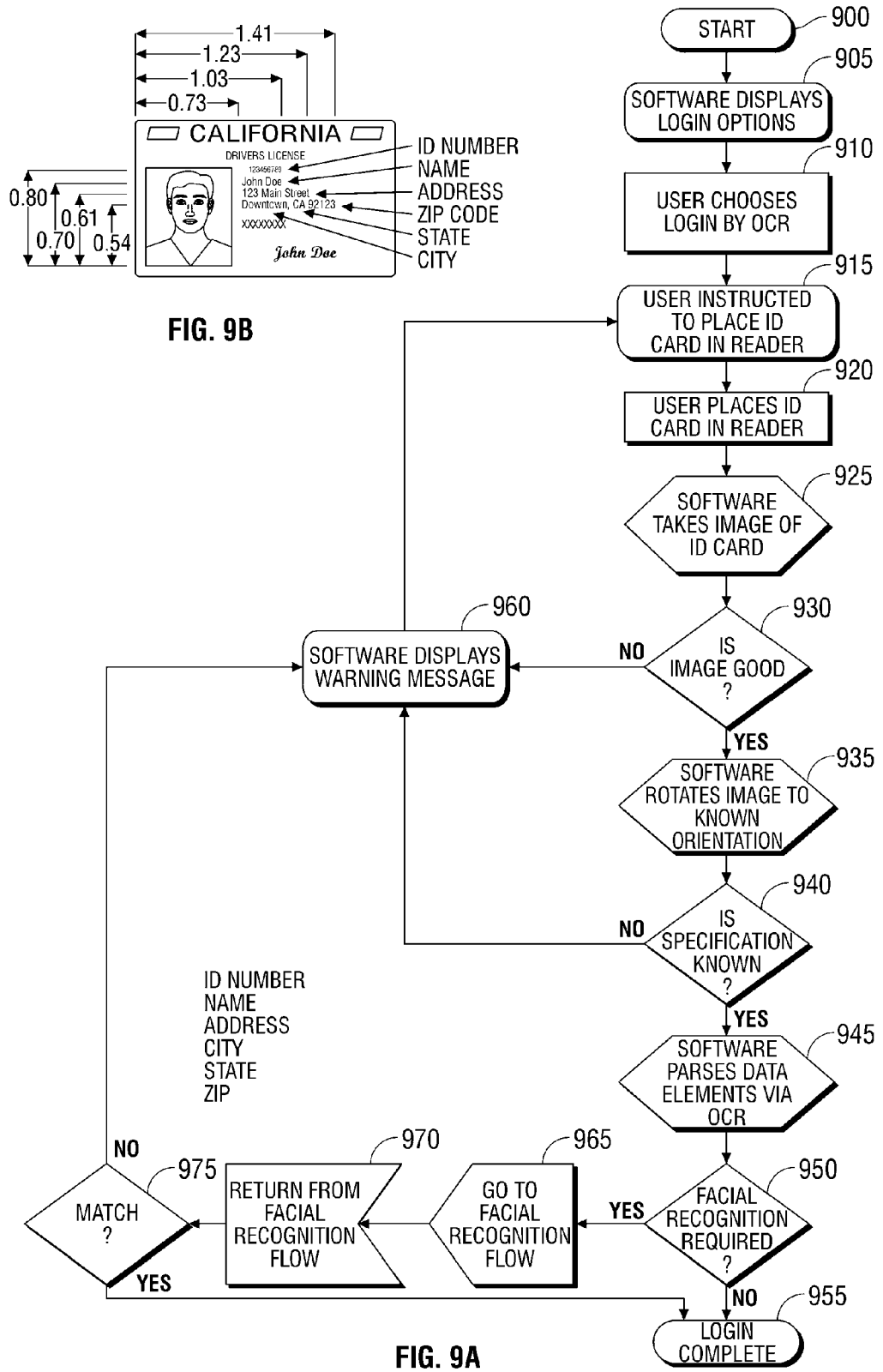
FIGS. 9A and 9B shows a login process based on optical character recognition (OCR) methods for identification.

For those identification cards without means for electronically storing data, FIGS. 9A and 9B show a login process that utilizes optical character recognition (OCR) to extract identification information that clearly identifies the individual that is represented by the document, card or other printed media. The process begins with step 900. The software displays login options in step 905, and in an embodiment, the user chooses to login by OCR in step 910. In step 915 the user is instructed to place the ID card in the OCR reader, which the user does in step 920. The software takes an image of the ID card in step 925, and checks to see if the image is good in step 930. If so, the software proceeds to step 935, otherwise the software displays a warning message in step 960 and transfers control to step 915. For example, the consumer may use a California drivers license as illustrated in FIG. 9B. The software (250) contains or may access the precise specification as to how the information and picture are configured in validly issued identification cards. If the identification card is not configured according to the AAMVA standard, which is incorporated by reference in its entirety, the process would not know where the data is that needs to be extracted (name, address, date of birth, . . . ) in order to properly identify the person. FIG. 9B provides an example, and shows a California drivers license. The measurements show exactly where each data are laid out, and is based on the current specification.

In step 935, the software rotates the image to a known orientation to extract identification data, such as the person's name, address, identification number, etc., from the identification card, and in step 940 the software checks to determine whether the specification for the ID card is known. In this case, the specification means the precise location where the desired identification data is located.

Since this may be repeated for a number of different forms of identification, it is important to identify traits that clearly identify each individual form. This is done by identifying specific characteristic of the identification. For a California Driver's License, example characteristics that must be matched may include the dimensions of the license; the location, size, color and font for the word "CALIFORNIA"; the size and location of the two pictures of the individual; and the seal of the state of California.

The specification can either be pre-programmed into the software, such as in a database table, or alternatively, the computer may access an available network to access the specification in a remote database. If the specification is not known, control is transferred to step 960, and the software will communicate a warning message to the consumer. The consumer may either try and input the identification card again, or the transaction may be canceled. The data that are required to identify an individual are called out on the ID. Measurements are taken to determine the exact locations for each data element. If the specification is known, control passes to step 945 in which the software parses data elements using the technology of optical character recognition (OCR). In this step, the software then examines the necessary data from the inserted identification card, and compares the extracted data to the known specification. The software takes the following steps to read a form of identification using OCR:

1. Take image of the identification;
2. Compare the characteristics of the image to the different forms of ID that are stored in the database table. If the ID matches a known/specified form, then proceed;
3. One by one, identify the location of each individual data element. Run that section of the image through an OCR routine;
4. This data is then used going forward in the same manner as if the data were read from an electronic storage mechanism, such as a magnetic stripe;

In step 950, a check is made to determine whether facial recognition is also required for validation. If facial recognition is required, a facial recognition process described above and illustrated in FIG. 10 may be implemented.

Step 965 implements an embedded facial recognition function and waits for the result, which is received in step 970. In step 975, the software determines whether facial recognition showed a match; if not control passes to step 960. If a match has been found, or if no facial recognition is required, control is passed to step 955, and the login process has been successfully completed.

The invention may implement any of the log-in methods described above or illustrated in FIGS. 4-9A and 9B, and one or more of these methods may be combined, depending upon the regulations, level of security, or store preference. In addition, a picture may be taken of the consumer to be used in the login process, or later, the validation process. Returning to FIG. 1, the consumer may then identify the requested products (130). In one embodiment, the items are selected through use of an internet-type shopping cart data interface, which may be displayed to the consumer using a monitor or CRT, and which facilitates the user to specify the products he/she desires to purchase. Other data selection methods can be used, such as a simple listing of the products, or the products may be depicted on a screen or other accompanying display to allow the consumer to "point and click" on the desired regulated products. Other information interfaces can be used.

In embodiments where the consumer interface is associated with, or included as part of a vending device, the consumer may be allowed to select items he/she desires to purchase, by referencing the corresponding storage locations of the desired products. The consumer may input the corresponding storage location which may be identified by a Cartesian-type coordinate system, sometimes designated by letters or numbers that correspond to the rows and columns where such items are stored. Alternatively, more sophisticated selection methods may be used, such as the shopping-cart or other selection interfaces previously discussed. Regardless of the method used to select items, no regulated items are delivered to the consumer until the validation procedures (140) occur.

Figure 19:
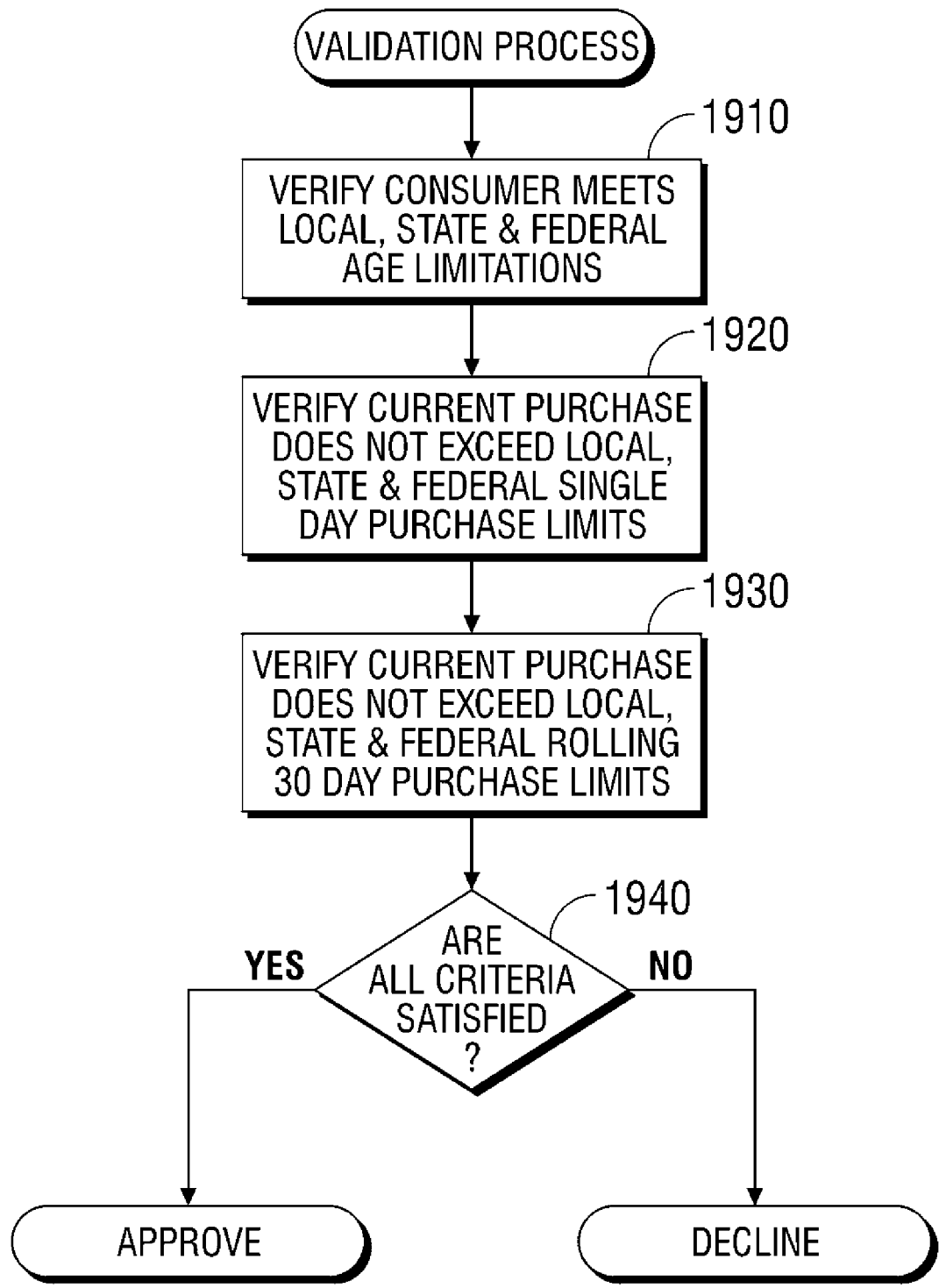
FIG. 19 illustrates an exemplary validation process.

After the consumer has selected the regulated product, the requested purchase transaction must be validated to determine whether the consumer is eligible to purchase the requested items (step 140, in FIG. 1). FIG. 19 provides a flowsheet describing an exemplary validation process that can be used in conjunction with the purchase of regulated, over-the-counter medications, such as pseudoephedrine. The method involves the steps of verifying that the consumer meets local, state and federal age limitations (1910), verifying that the requested purchase does not, whether individually or when summed with other purchases for that day, exceed single day purchase limits (1920), and verifying that the current purchase, when summed with previous purchases within the previous 30 days, does not exceed the applicable federal, state, or local limitations (1930). If these criteria are satisfied the purchase may be approved; if not the purchase may be declined (1940).

Figure 11:
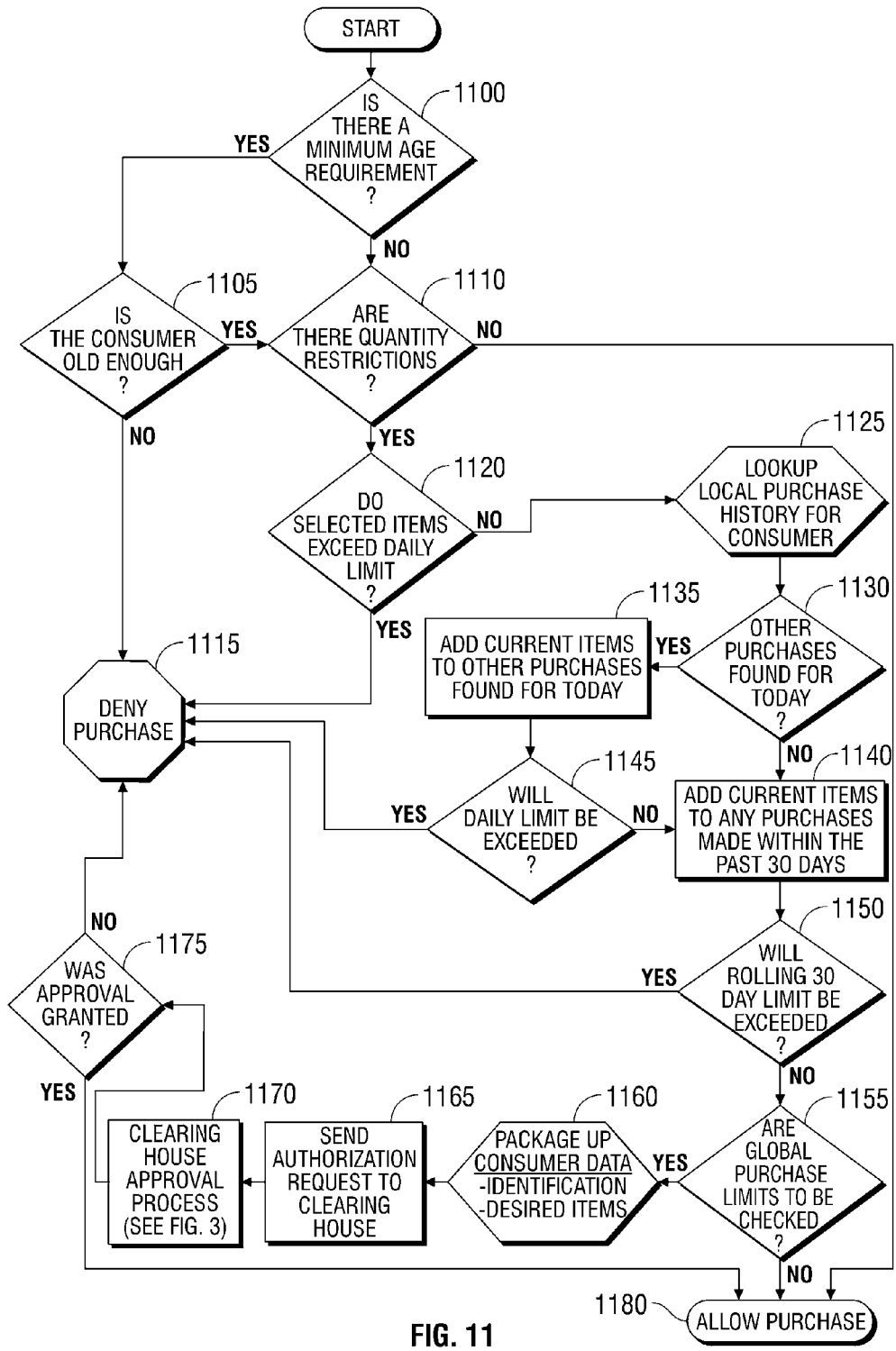
FIG. 11 describes a process embodiment for validating a customer's purchase request.

FIG. 11 illustrates a validation process embodiment. After the consumer has successfully identified himself/herself, the validation procedures allow for a determination as to whether the consumer may lawfully purchase the requested items, depending upon a number of criteria that may be programmed within the validation software according to any applicable regulations. Steps 1100 and 1105 depict decision points based on a minimum age requirement. If there is a minimum age requirement, control passes to step 1105. In step 1105, the age of the consumer is compared to the regulated limit. If the consumer is old enough, control passes to step 1110, otherwise control passes to step 1115. At step 1115, the approval to purchase the requested regulated item is denied, because the consumer does not meet the minimum age criteria.

If the minimum age requirement is met, or if there is no minimum age requirement, control passes to step 1110. At step 1110, the computer determines if there are additional purchase restrictions, such as those based on quantity. If so, control passes to Step 1120, which begins the process for determining whether any regulations related to the quantity of regulated product may restrict the purchase of the requested regulated product.

Figure 12:
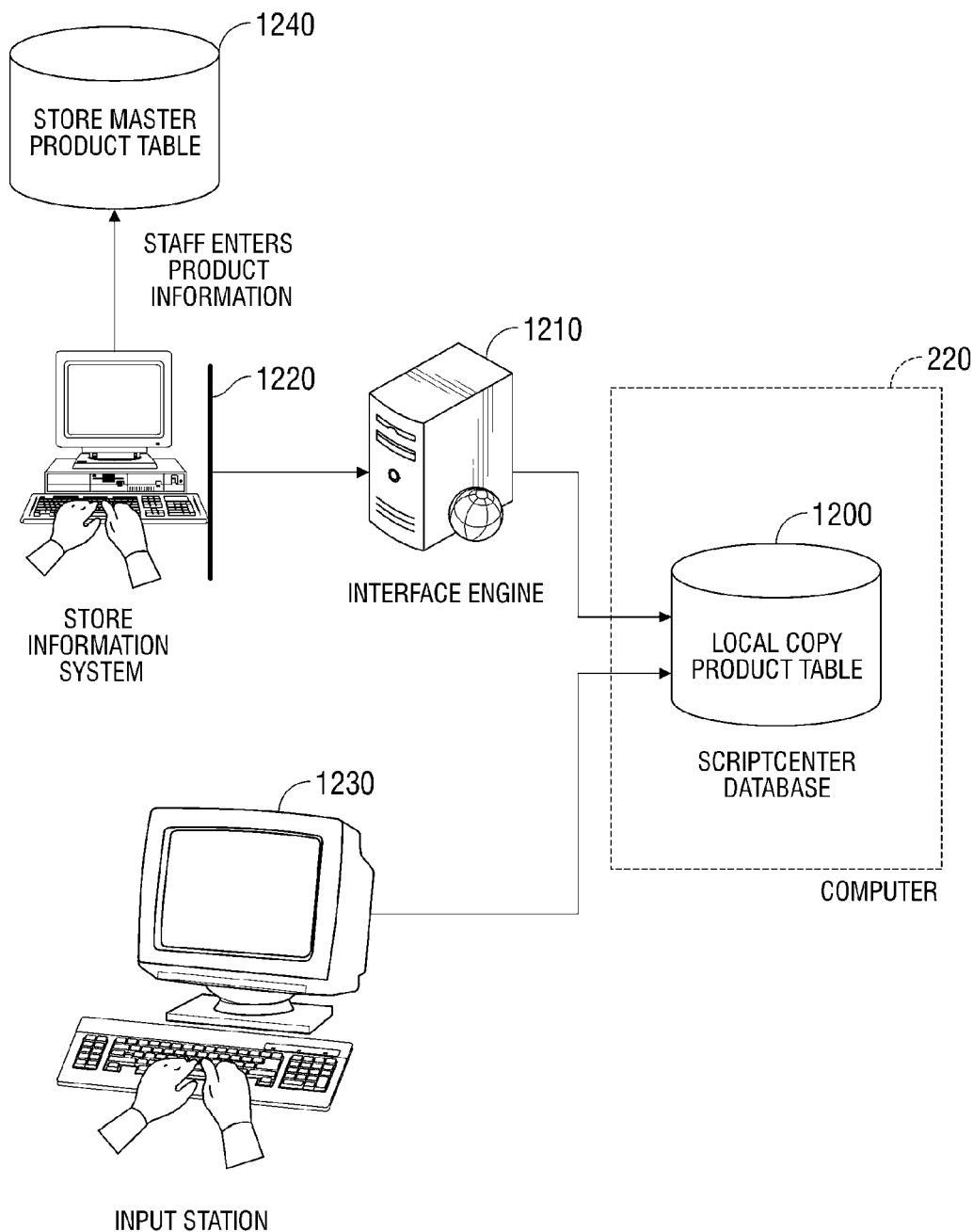
FIG. 12 illustrates methods for populating the local product table database.

In step 1120, the software determines whether the requested quantity for the specific transaction being validated exceeds the maximum purchase amount. The pertinent data for the requested regulated product may be contained within a local product table (1200) (FIG. 12). The product table is a database containing the product name, UPC information, price, amount of regulated products, and any other necessary descriptive information that is used to validate or consummate the purchase transaction. The product table will be large enough to catalogue this product information for all products stored within the vending apparatus, and is updated as products are added to the device. As illustrated in FIG. 12, the local product table may be contained on the computer (220). The local product table may be created either manually (1230) by directly inputting product information into the local database (1200) using a central input station (1230), or by importing data from a database (1240) in the store's product information system (1220), which the computer may access through an interface engine (1210). The interface engine is software for linking multiple computer systems, and allows the computer to communicate with the store's database, and allows for the seamless importation of pertinent data from the store information system to the local product table. Typically, interface software is specialized depending upon the nature of the systems being linked.

Thus, if the regulations only permit a consumer to purchase 3.5 grams of pseudoephedrine within a specified time period, and the consumer has requested products that, when added together, exceed this maximum amount, control will pass to step 1115, and the software will deny approval for the transaction. In this case, a message may be sent to the consumer that he/she has requested to purchase too many products, and will provide the consumer the opportunity to eliminate one or more requested products in order to comply with the maximum purchase amounts. If the requested transaction involves a request to purchase a quantity of regulated products that is less than the maximum amounts, control will pass to step 1125.

In step 1125, local purchase history is gathered for the consumer. This local history is stored in a database (1200) accessible by the computer, which may be stored in the computer's memory. In step 1130, the process checks whether other purchases by the identified consumer were found for a first time period, such as the present day, which is then retrieved by the computer. Any specified time period used to implement the method of the present invention may be used, and that time period may be comprised of minutes, hours or days, and may be defined by calendar boundaries, or may be based on a rolling time span without calendar boundaries. Specified time periods are designed to implement federal, state, or local laws applicable to the distribution of regulated products, particularly over-the-counter medications, and can be preprogrammed within the software to ensure that they accurately reflect the latest regulations. In addition, the software may be easily changed, either at the site or by interfacing with the software remotely, if the laws change, or in the event other parameters need changing.

As illustrated by step 1130, if the consumer has made other purchases within the first specified time period, in this case a one day time period, control of the validation process is transferred to step 1135; if this is the only purchase for the present day, control is transferred to step 1140.

In step 1135, the computer sums the collected purchases over the course of the present day to calculate the total amount of the regulated parameter. When the regulated product is pseudoephedrine-containing medications, or other regulated pharmaceutical products, the weight of active ingredient may be used as regulated parameter. Other embodiments could include the number of pills, the total number of purchases, the volume of liquids (for such things as spray paint or other volatile chemicals that could be used for criminal purposes).

A check on the daily limit is performed in step 1145. The regulated amount allowable on a daily basis is compared to the sum calculated in step 1135, and control of the validation process is transferred to step 1140 in the event that the check shows that the requested product does not exceed the maximum allowable amount for that day when combined with any previous purchases for that day. In the event that the check indicates an amount that exceeds the regulatory permissible amount, control of the validation process is transferred to step 1115. As before, a message may be sent to the consumer that he/she has requested to purchase too many products, and will provide the consumer the opportunity to eliminate one or more requested products in order to comply with the maximum purchase amounts. If the purchase request is for a single product, the purchase request is denied.

An electronic display may be used to inform the prospective consumer that the purchase has exceeded regulatory limits, and the purchase request is denied. In another embodiment, a printed form is prepared for issuance to the prospective consumer. In still another embodiment, the attempt to purchase an excessive amount of product is formatted into a message that is sent to inform police, regulators, store owners, adult guardians, parole officers or other concerned third parties that an attempt has been made to exceed the regulatory permissible amount of the controlled substance.

In step 1140, the computer may identify all purchases over a second time period, such as a rolling thirty (30) day period, and then sums either the total number of purchases, the amount of regulated product in terms of total weight, number of pills, or other applicable metric(s), in order to calculate the total amount of the controlled substance that may be subject to additional regulations based on this second time period In another embodiment, the purchases over the course of a calendar month—28 to 31 days—are collected and summed to calculate whether the requested purchase, when summed with previous purchases, would exceed the total amount set by the regulations. In still another embodiment, any prescribed rolling period of time is used to collect purchases by an individual consumer. In still another embodiment, the attempt to purchase an excessive amount of product is formatted into a message that is sent to inform police, regulators, store owners, adult guardians, parole officers or other concerned third parties that an attempt has been made to exceed the regulatory permissible amount of the controlled substance.

For the second specified time period, the summed quantity of the regulated substance is compared against the regulatory limit for that substance in step 1150. If the summed quantity of the regulated substance purchased within the second specified time period exceeds the maximum specified in the applicable regulation(s), control of the validation process is passed again to step 1115, and the previously described messages may be sent to the consumer. If the summed quantity of the requested transaction and previous transactions does not exceed the minimums for the second specified time period, control of the validation process is transferred to step 1155, In step 1155, the process may determine whether global purchase limits are to be checked. This is an optional step, depending upon whether the store participates in a larger validation network, which may consist of a plurality of stores of the same chain, or a plurality of stores located within a specified geographic location. Such a global network will allow law enforcement to better track potential criminals that seek to purchase quantities of regulated products that exceed specified maximums, by traveling to different stores that under the current manual record-keeping system, have no ability to track a consumer's overall purchase history. If global validation procedures are not employed, control is passed to step 1180, and the requested transaction is approved.

Figure 13:
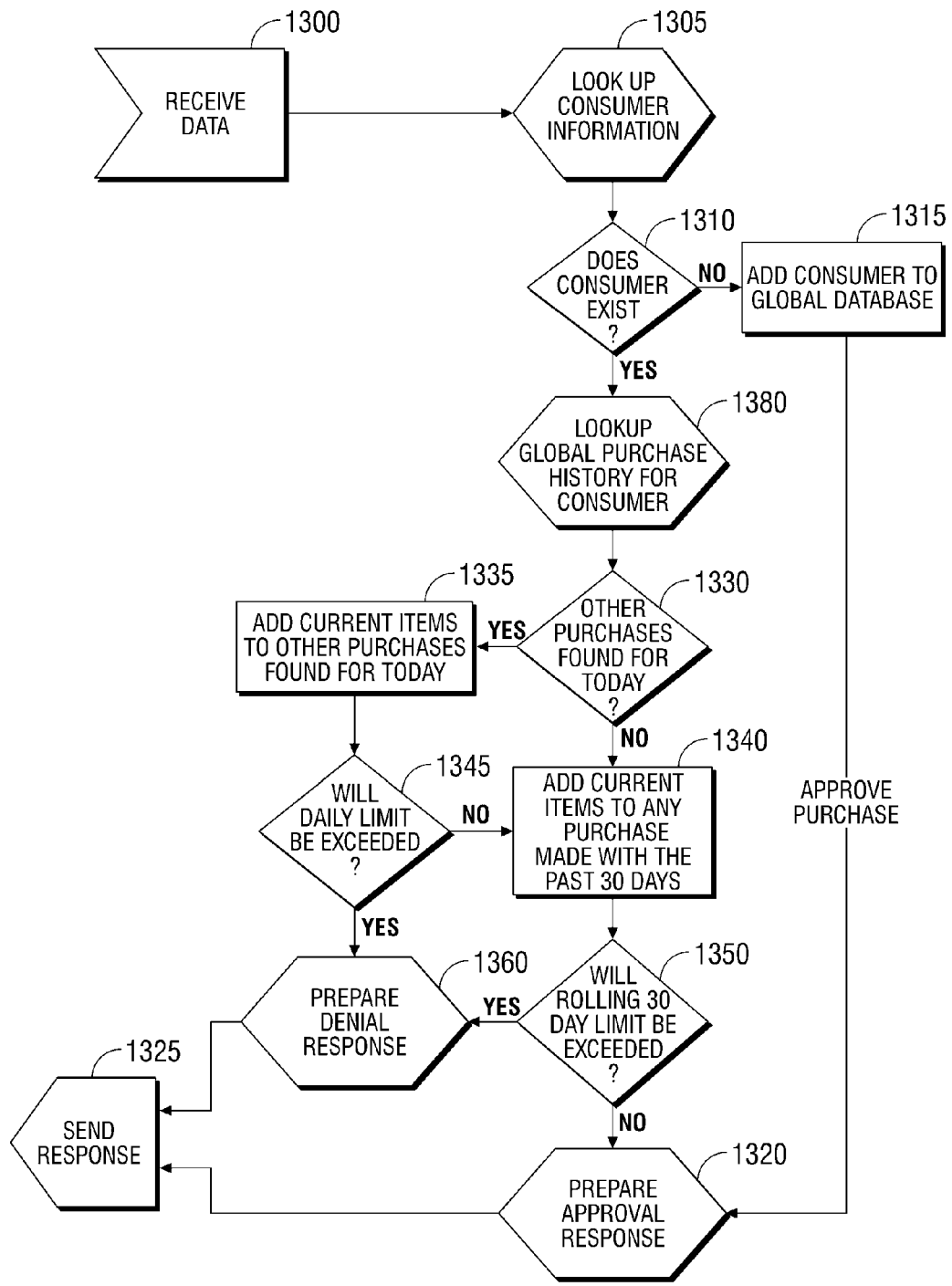
FIG. 13 illustrates a process for using a clearing house to validate purchase transactions.

If global validation procedures are employed, control passes to step 1160. In step 1160, the consumer's identification and the pertinent information concerning the items to be purchased are packaged for submission to a clearing house. In step 1165, the package of data is sent to a central data repository, such as a Clearing House to request approval of the purchase. FIG. 13 describes the optional global validation processed in more detail. In Step 1300, transaction data is received concerning a requested transaction. The identification information is processed by clearing house, which uses it to look up the consumer and his/her purchase history, which is stored within a database accessible by the clearing house. The database contains information about the consumer's purchases over a specified time period or time periods, depending upon the applicable regulations, and the identification information is used to look up those purchases so that the computer may determine whether the requested transaction will, when summed with the consumer's previous purchases, comply with the applicable regulations. In addition, the identifying information will be used to update the consumer's purchasing history if the requested transaction is approved.

In Step 1305, the identification information is processed by the computer (220), which uses it to look up the provided data in database, such as the retailers local database, or in a global database, to list two possible embodiments. The database contains information about the consumer's purchases over a specified time period or time periods, depending upon the applicable regulations, and the identification information is used to look up those purchases so that the computer may determine whether the requested transaction will comply with the applicable regulations. In addition, the identifying information will be used to update the consumer's purchasing history if the requested transaction is approved.

In step 1310, the clearing house, through use of a computer, determines whether the consumer's information already exists in the clearing house database. If the consumer is not listed, then the consumer's identifying information is then newly stored in the clearinghouse database. In an embodiment with a single clearinghouse database, no further posting of the newly listed consumer's information is needed. In an embodiment with two or more levels of clearinghouse databases, the consumer's information is also posted to the next level of database in the hierarchy. For example, a single store in a chain of stores might post the consumer's information to a single higher level database which integrates all of the consumers from transactions in each and every store database. In that embodiment, the local stores might periodically download information from the integrated higher level database so that all consumers known to any store in the chain can be known in any store. In yet another embodiment, each chain (or single store) in a plurality of chains and stores could post new consumer identification data to a yet higher level database which is used to track all consumers known to a state regulatory agency, or an agreed-upon plurality of stores within a specific geographic area.

The identified consumer's purchases are retrieved from the clearinghouse database in step 1380. In the embodiment with a chain of stores reporting to a next higher level database, the collected database information from the higher level database may be posted periodically to each local store database to ensure proper functionality when the next higher level database is unavailable. In a state wide or region wide embodiment, the next higher level database contains information about consumers which spans all chains and stores in the entire geographic region in which the regulations apply.

Steps 1330, 1335, 1345, 1340 and 1350 in the global validation process correspond to steps 1130, 1135, 1145, 1140, 1150, described above, and the logic is substantially identical. In step 1325, an approval response is prepared and control of the validation process is transferred to step 1325. In step 1325, the approval response is sent to the requesting computer, to indicate whether the particular transaction is approved by the central clearinghouse.

Returning to the main validation flow described in FIG. 11, in step 1170, a response is received from the clearing house regarding the requested transaction. In step 1175, the computer determines whether approval from the clearinghouse was granted. If so, control passes to step 1180, and the purchase is allowed to proceed. If the clearinghouse indicates that the requested transaction is not approved, then control passes to step 1115, and the purchase request is denied.

Similar algorithms may be implemented to check the requested purchase against additional time periods, using similar logic structures as those described in FIGS. 11 and 13.

Figure 14:
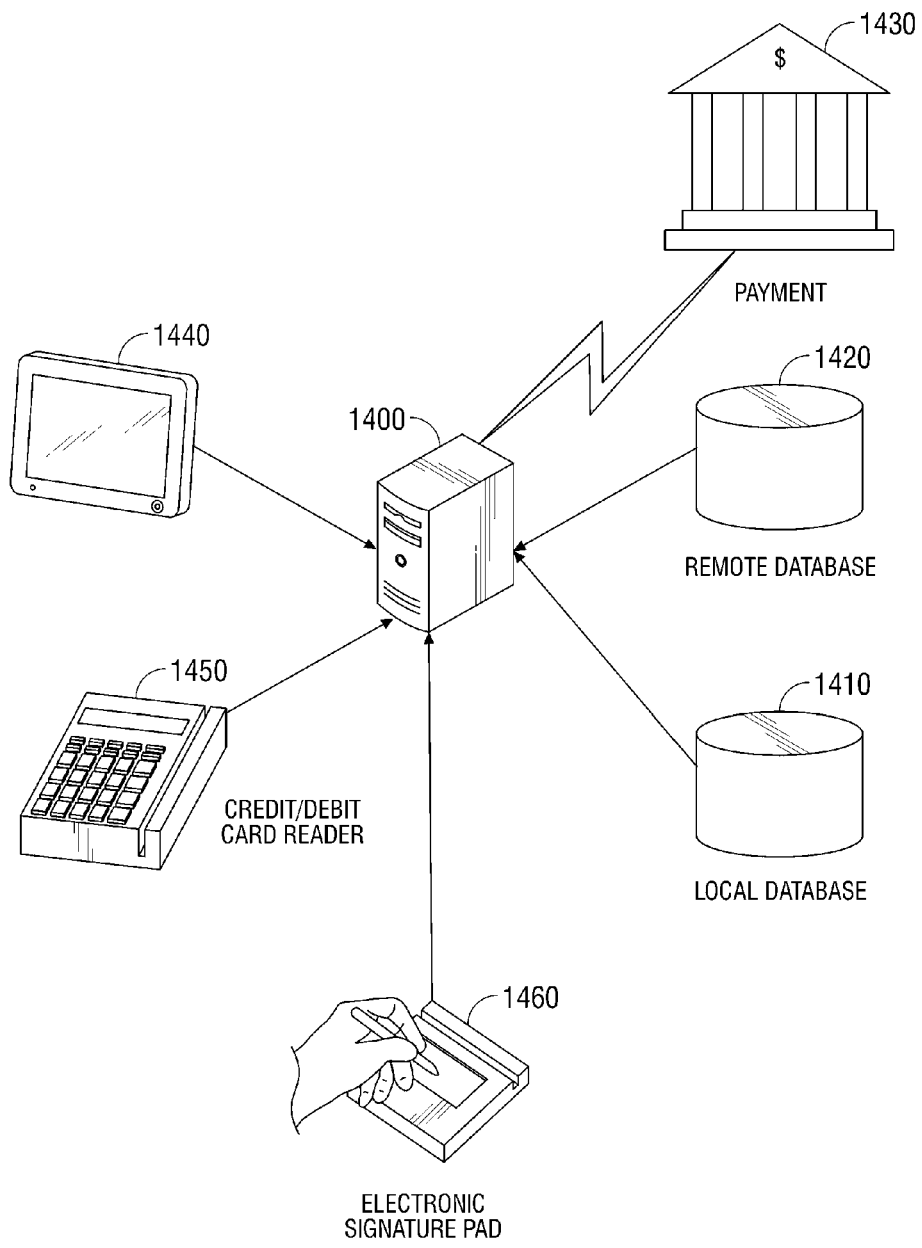
FIG. 14 illustrates a payment process that may be used with the disclosed inventions.

Returning to FIG. 1, and referencing FIG. 14, once the requested transaction is validated, the consumer may then offer payment (150). Various payment devices may be incorporated into, or associated with the consumer interface, including various magnetic stripe readers capable of reading credit cards, debit cards, store gift cards, and the like (1450). The payment device may also be a cash acceptor or various other devices, such as an RF based credit or debit token such as a speed pass reader. The computer may then process the payment, by either linking to the store's point of sale ("POS") system (1420) directly, or by interfacing with a credit card processing service (1430). In either case, transaction information is typically uploaded to the store's financial accounting system through methods known in the art.

Once payment has been received, the product may be delivered to the consumer (160). In one embodiment, the requested product can be vended directly to the purchaser, and the vended amount is recorded in the database of the embodiment, and all pertinent databases tracking purchases of regulated products are updated for use in subsequent transactions, and to be used in creating logs or reports as may be required under applicable regulations. In another embodiment, the requested amount is sent to a retail employee who manually selects the requested product and gives it to the validated consumer. In yet another embodiment, a printed or electronic record is given to the consumer, who takes it to the store employee, and the store employee dispenses the requested product to the consumer.

The amount of the regulated chemical products (or other regulated/tracked data) contained in the purchase are updated/stored in a local database. The database identifies precisely who purchased the products, how much they purchased, the consumer's photograph, and when they purchased the products. This information is referenced the next time the consumer attempts a purchase of regulated products. If a hierarchy of clearing houses are in place, then the same information stored in the local database is transferred to the next higher clearing house with the addition of the locality in which the products were purchased. This process will repeat with each level reporting to yet another higher level until all levels of Clearing House have received the data. Note that within this hierarchy, it is also possible that anyone level is monitored by multiple clearing houses. These clearing house may store duplicate data, share data, or some combination may be implemented.

The purchase information may also be sent to database to maintain an electronic log book of sales, which identifies the products purchased by name, the quantity sold, the names and addresses of the purchasers, and the date and time of the sale. Under the CMEA, the purchaser must sign the log book, thus an electronic signature pad (1460) may be used to transmit the consumer's signature to the electronic log book. Under the current law, this information must be maintained for two years.

In embodiments where the consumer interface is linked to, or part of a vending device (FIG. 15), the computer (220) may also control the vending device. Alternatively, the vending device may have additional controllers and/or a separate computer to control the vending process. Depending upon the configuration, computer 220 must send a signal to either the vending controller, and/or provide the necessary instructions, to vend the specified, approved product to the consumer. For a simple helical coil device illustrated in FIG. 15, once the purchase transaction has been approved, a control signal causes the helical coils to rotate until the requested, validated product is delivered to a central opening to allow the consumer to retrieve it. Other vending embodiments will deliver the approved, regulated product according to their specific configuration and architectures, and many different architectures are contemplated and within the scope of the invention. For example, as disclosed in Pinney, the delivery mechanism may comprise a picker arm, shuttle and gripper that travel into the storage area to locate the desired product and then lift the product and move it to a delivery point. Other delivery mechanisms may include a plurality of bins that rotate about a horizontal axis, as disclosed by Denenberg, or alternatively, a plurality of storage bins that rotate about a vertical axis or axes, as disclosed in Pixley, which may translate the products to an access point or points, depending upon the bin configuration.

The bins may be configured in virtually any shape or form, and the invention contemplates different levels of bins, as shown in Pixley, Pinney, or Denenberg. Another embodiment could use bins that rotate vertically versus horizontally. Another embodiment might employ a robot arm that moves precisely to the product, picks it up and delivers it. Other embodiments might use an overhead picking, grabbing, or suctioning mechanism that positions directly over the intended product, lowers an arm or other mechanism to the product and then captures the product by means of a gripper, magnet, or vacuum and then lifts and moves the product to a delivery bin. In addition, a horizontal delivery mechanism that incorporates a conveyor (or series of conveyors) may be used to advance the product instead. The invention is intended to incorporate any product transport mechanism or structure capable of mechanically retrieving or conveying a (and various combinations of such mechanisms or structures) the regulated product within a confirmed space to an access point or points.

FIG. 15 illustrates an exemplary embodiment for implementing the method of FIG. 1 that utilizes a vending apparatus (1500). As illustrated, the consumer engages the consumer interface (1510), which in this embodiment is a touchscreen (1520). The consumer identifies himself/'herself, either through the log-in method of FIG. 4 or FIG. 6 (1530). The consumer then uses the touchscreen to select (1540) an appropriate regulated product (1560). Once selected, the validation process proceeds (1550), including an optional global clearinghouse validation (1570). If approved, the consumer then makes payment (1580), and the device vends the requested product (1590).

In addition, a consumer's personal computer 1530 or personal digital assistant 1530 or cell phone 1530 can also be part of the communication network to perform the necessary data entry, product selection tasks, and coordinate purchases with the vending apparatus 1540.

Figure 16A:
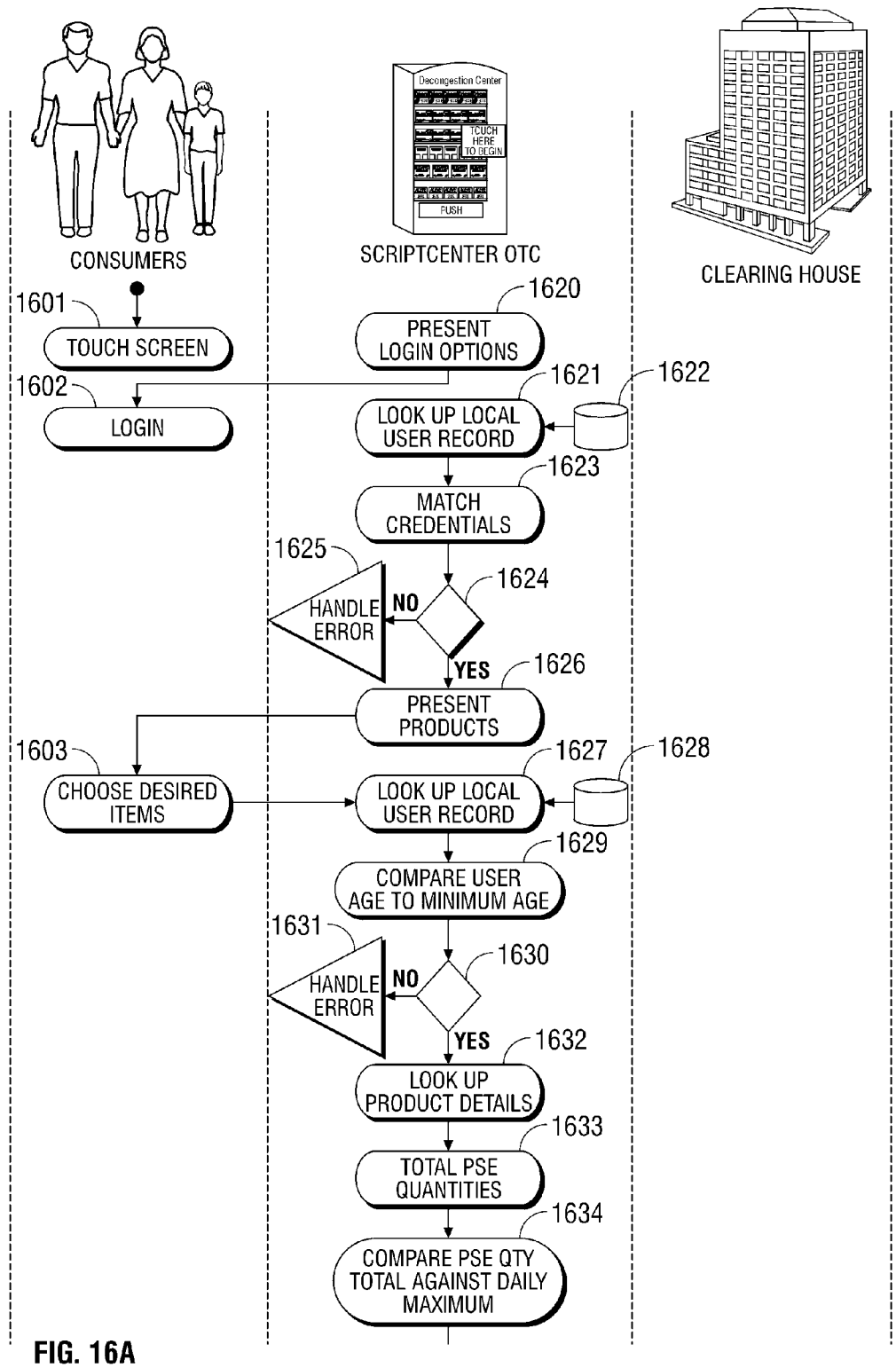
FIGS. 16A-16C, diagrams an embodiment process which relates the consumer requests to the vending machine and the clearing house.
Figure 16B:
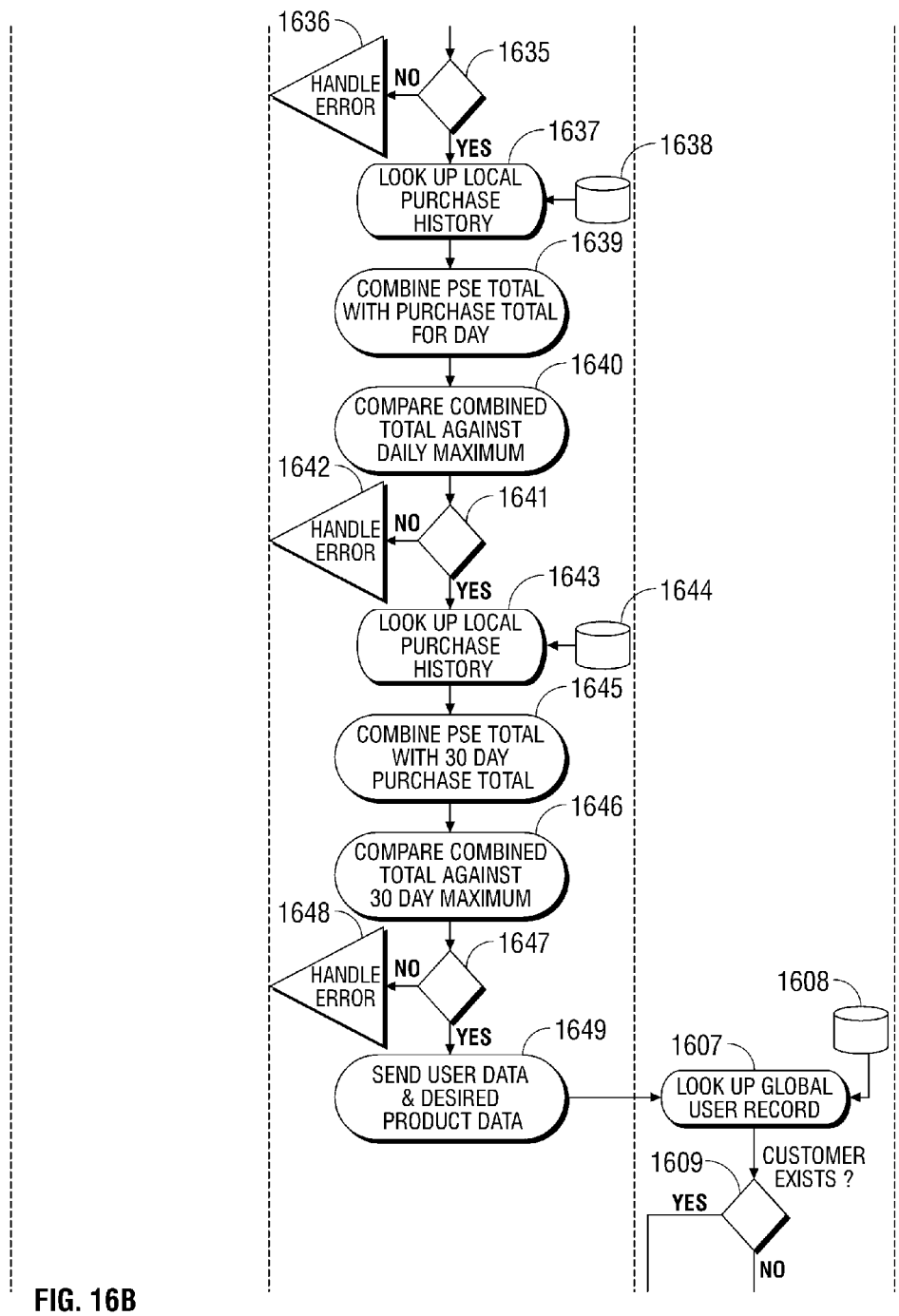
Figure 16C:
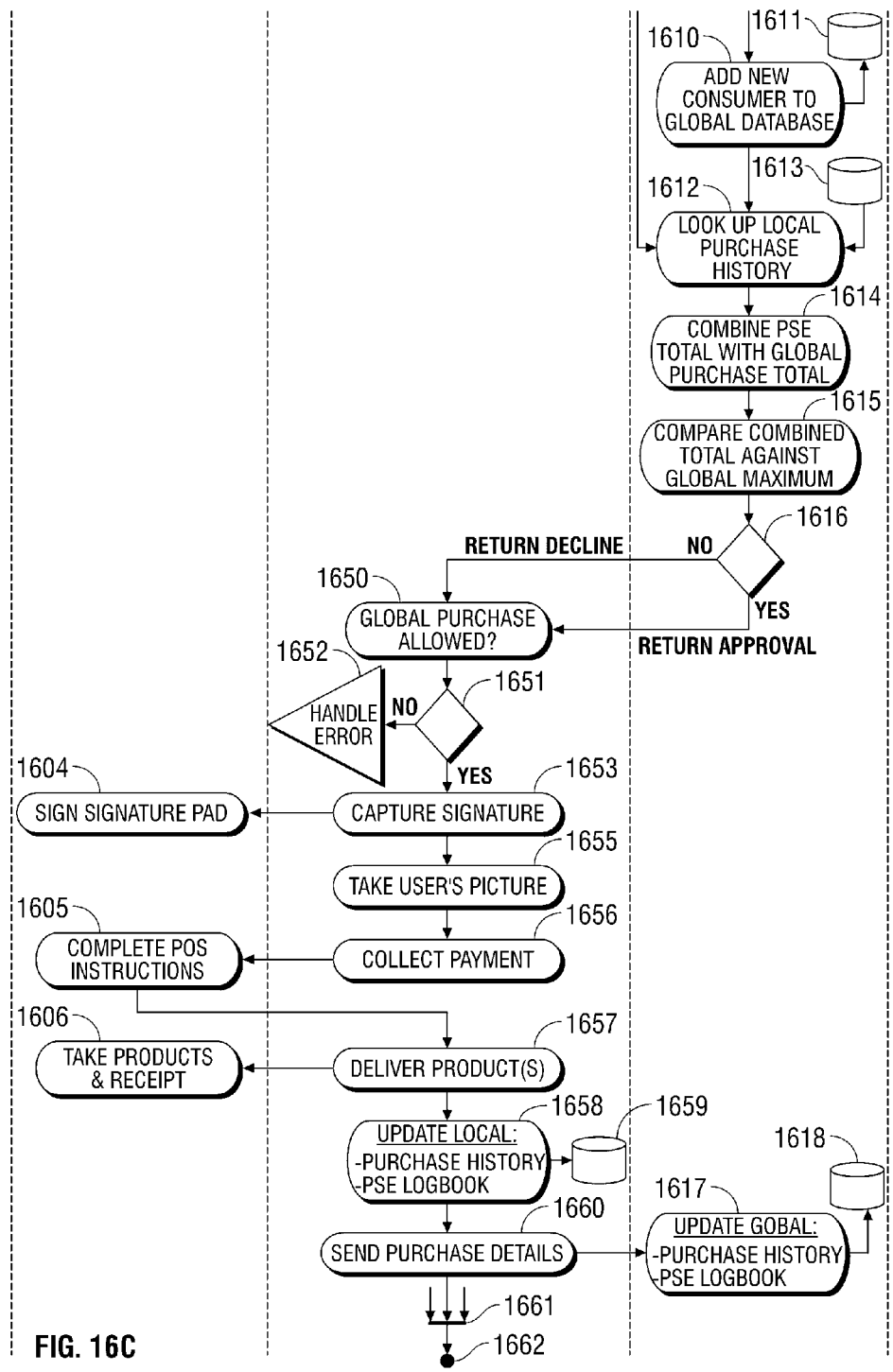

FIGS. 16A-16C are activity diagrams that further illustrate an embodiment that utilizes a consumer interface, vending device, and clearing house, all networked to efficiently perform a sales transaction for a regulated product. In this embodiment, the consumer activates a touch screen 1601, and the system presents login options 1620, allowing the consumer to log in 1602, whereupon the system looks up the local user record in step 1621 using a database 1622 to match the consumer's credentials 1623 and check for a proper match 1624. If there is no match, the error is handled 1625, otherwise the vending products are presented 1626 and the consumer chooses desired items 1603, which the system looks up with the local user record 1627 in a database 1628, and compares the user's age to the minimum age 1629 for the products. The system checks whether the user's age is acceptable 1630 and handles the error 1631 if it is not, otherwise the system looks up product details 1632 and sums the total pseudoephedrine quantities 1633, comparing the pseudoephedrine total against the regulatory daily maximum 1634. The system checks 1630 for proper daily maximums and handles the error 1636 if not proper.

Otherwise the system looks up the local purchase history 1637 in a database 1638, combining the pseudoephedrine total with the purchase total for the day 1639. Then the system compares the combined total against the daily maximum 1640 and checks whether the combined total is proper 1641, handling the error 1642 if not proper.

If proper, the system looks up local purchase history 1643 in a database 1644 and combines the pseudoephedrine total with the 30 day purchase total 1645, comparing the combined total against the 30 day regulatory maximum 1646, checking the amount 1647, and handling the error 1648 if not proper. Otherwise the system sends user data and desired product data 1649 to the clearing house, and the clearing house looks up the global user record 1607 in a database 1608. If the consumer exists, control is passed to step 1614. If the consumer does not exist 1609 in the database 1608, the clearing house adds a new consumer 1610 to the global database 1611, and looks up global purchase history 1612 in a global database 1613.

In step 1614, the clearing house combines the pseudoephedrine total with the global purchase total and compares the combined total against the global maximum 1615. It checks 1616 and if the amount is proper it returns a decline, otherwise it returns an approval to the vending system in step 1650.

The system then checks 1651 for approval from the clearing house and handles the error 1652 if not approved, otherwise it captures the consumer's signature 1653 and takes the user's picture 1655 and collects payment 1656. In step 1657, the system delivers the product or products, then updates the local purchase history and pseudoephedrine logbook 1658 on the database 1659. The system then sends purchase details 1660 to the clearing house, where the global database is updated with the purchase history and the pseudoephedrine logbook in a database 1618.

In step 1661, when all three processes have completed, the system terminates the process 1662.

Figure 17A:
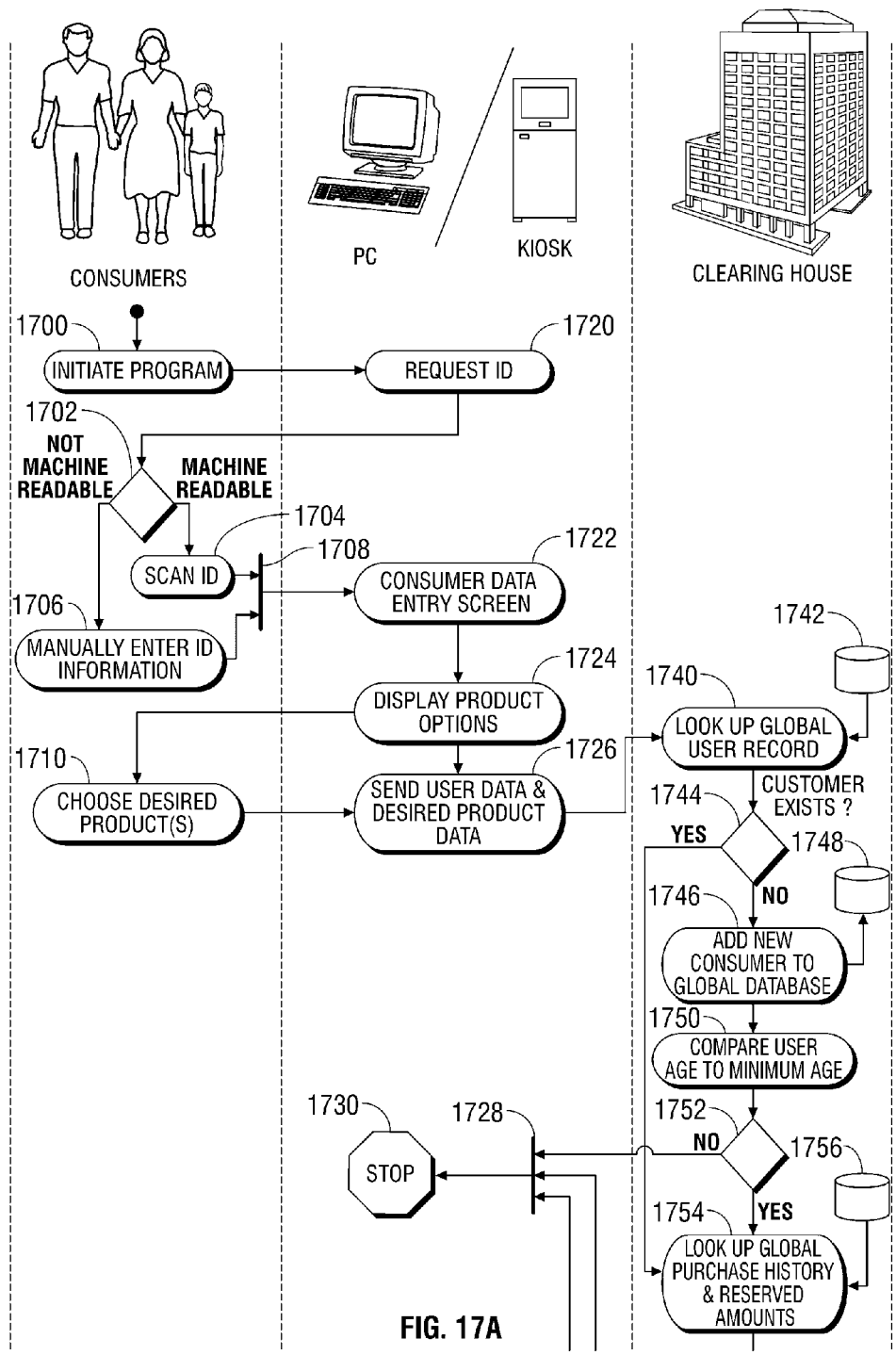
FIGS. 17A and 17B show an embodiment which relates consumers and the clearing house to a kiosk or desk-top computer embodiment of the invention.
Figure 17B:
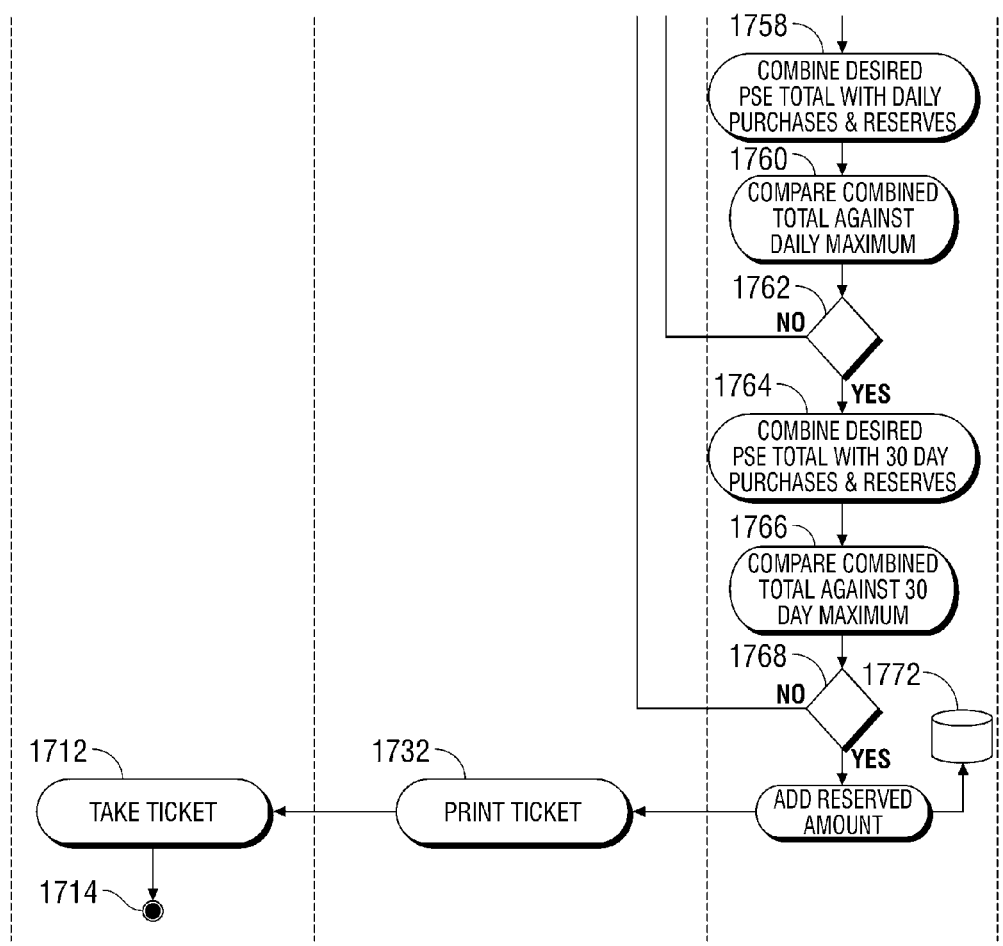
Figure 18:
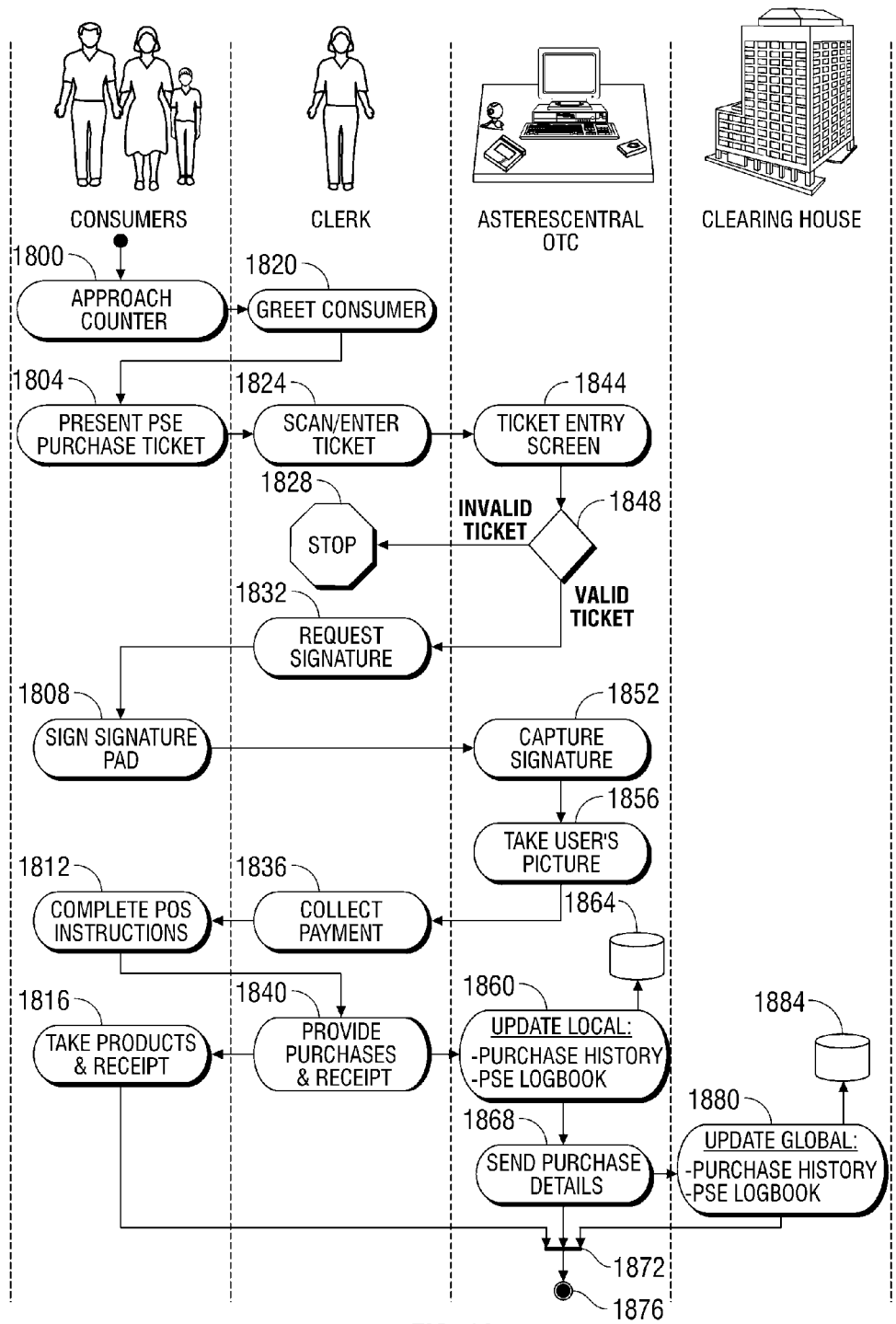
FIG. 18 describes an embodiment in which a clerk remotely (or locally) accesses a Central Over the Counter (OTC) computer system which coordinates with a clearing house.

FIGS. 17A-17B and 18 are activity diagrams that show an embodiment which involves the validation of a purchase request through use of a kiosk or PC that is networked to a clearing house, and the subsequent delivery of the regulated product to the consumer. In step 1700 the consumer initiates the program, and the PC/kiosk requests an ill. In step 1702, the consumer chooses whether to use a machine readable ill in step 1704 or an ill without machine readable capabilities in step 1706. The machine readable ill is scanned in step 1704 or manually entered in step 1706, and the chosen ill is presented to the PC/kiosk in step 1708, which displays a consumer data entry screen in step 1722, and displays product options in step 1724. The consumer chooses desired products in step 1710 and the PC/kiosk system sends user data and desired product data to the clearing house 1726 where the clearing house looks up the global user record 1740 from a database 1742 and determines whether the consumer exists 1744, in which case control proceeds to step 1754, otherwise a new consumer is added 1746 to the global database 1748 and the clearing house compares user age to minimum age 1750.

If the minimum age 1750 is not met, control transfers to step 1728, otherwise the clearing house looks up 1754 global purchase history and reserved amounts in a database 1756 and combines desired pseudoephedrine total with daily purchases and reserves 1758. If the desired pseudoephedrine total is more than the regulated daily maximum 1760, a comparison 1762 transfers control to step 1728, otherwise the desired pseudoephedrine total is combined with the day purchases and reserves 1764 and compared against the 30 day regulatory maximum 1766. If the comparison 1768 shows that the 30 day maximum would be exceeded, control transfers to step 1728, otherwise the reserved amount is added 1770 to the database 1772 and the PC/kiosk prints a ticket 1732 for the consumer, who takes the ticket 1712 and the process is then complete 1714.

In step 1728, the process is terminated without printing a ticket and the PC/kiosk process comes to a stop at step 1730.

Once the purchase transaction has been validated, the regulated product may be delivered to the consumer according to the process illustrated in FIG. 18. The consumer first approaches the counter 1800 and the clerk greets the consumer 1820. The consumer presents a purchase ticket 1804 for a regulated product and the clerk scans or key enters the ticket 1824 into the ticket entry screen 1844 where it is checked 1848 for validity. Invalid tickets cause the clerk to stop 1828 the transaction, while valid tickets cause the clerk to request a signature 1832, and the consumer provides the signature 1808 in a signature pad which is connected to a central computer system ("OTC system"). Using an electronic signature pad, and a camera, the OTC system captures the signature 1852 and takes the user's picture 1856. Then the clerk collects payment 1836 and the consumer completes the point of service instructions 1812. Alternatively, payment may be made through use of a networked payment device, such as a credit card reader. The clerk provides both the purchased products and a receipt 1840 to the consumer, who takes the products and receipt 1816, while the OTC system updates the local purchase history and logbook in a database 1864 and sends the purchase details 1868 to the clearing house which updates the global purchase history and logbook in a database 1884. The process terminates 1876 when all four components have completed 1872.

Figure 20:
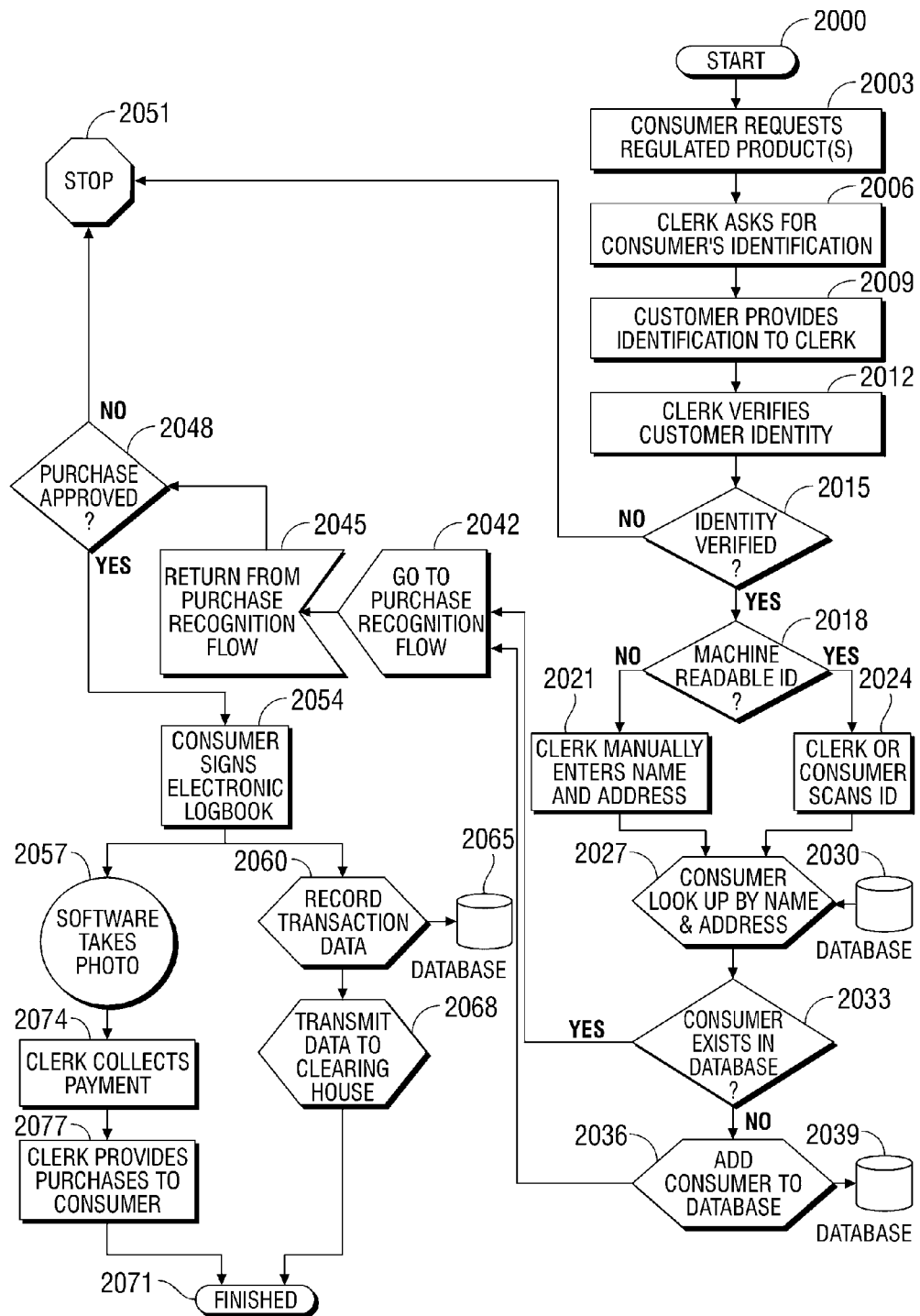
FIG. 20 illustrates an additional process embodiment which was an automated validation process, but manual delivery of the requested product.

FIG. 20 charts a process embodiment, starting in step 2000, that assists a retail clerk in managing sales of controlled substances. In step 2003, the consumer communicates a request for regulated products. In step 2006, the clerk requests identification from the consumer, which the consumer provides in step 2009, and the clerk verifies in step 2012. In step 2015 the identity is verified by the clerk, and control passes to step 2051 if the identity in not suitable for verification, otherwise control passes to step 2018.

In step 2018, the clerk determines whether the ill is machine readable. If so the clerk scans the ill, or the clerk instructs the consumer to scan the ill, in step 2024. If not machine readable, the clerk manually enters the name and address of the consumer in step 2021. In step 2027, software for supporting the clerk looks up the name and address of the consumer in a database 2030. If the consumer exists in the database 2030 in step 2033, then control passes to step 2042, otherwise to step 2036, where the software adds the consumer to the database 2039 for future recovery.

In step 2042, the purchase validation process is started, which produces a result in step 2045. In step 2048 a check is made as to whether the purchase was approved; if not, control passes to step 2051, otherwise the consumer is asked to sign a logbook in step 1854, and then two concurrent processes are invoked beginning in steps 2057 and 2060.

In step 2060, the transaction data is recorded in a database 2065, and then in step 2068 the data is transmitted to the clearing house, and then control is transferred to step 2071. In step 2057, the software takes a photograph of the consumer and then the clerk collects payment from the consumer in step 2074, and provides the purchased items to the consumer in step 2077. Control then passes to step 2071 in which the process embodiment is completed.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

We claim:

1. An apparatus for conducting a sales transaction for a regulated product comprising:
   a processor;
   a non-volatile storage medium, the non-volatile storage medium containing a set of processor executable instructions that, when executed by the processor configure the apparatus to:
   provide a consumer interface configured to receive identification information from a consumer;
   prompt the consumer to select a regulated product;
   use the identification information and at least one product data derived from the regulated product to determine that the sales transaction complies with an applicable regulation governing the sale of the regulated product:
   deliver the product to the consumer:
   wherein the regulated product comprises a medication containing an ingredient subject to regulation, the ingredient comprising pseudoephedrine, ephedrine. Or phenylpropanolamine; and
   wherein the configuration to determinate is a configuration based on the consumer's purchases over a time period established by the regulations of regulated products selected from the group of the same medication, substantially similar medications, or medications containing the same regulated ingredient as that contained in the product the consumer desires to purchase.

2. The apparatus of claim 1, wherein the product data is a quantity of an ingredient of the regulated product.

3. The apparatus of claim 2, wherein the configuration to determine comprises a configuration to compare the ingredient quantity to a maximum quantity over a time period.

4. The apparatus of claim 3, wherein the configuration to determine comprises a configuration to compare the ingredient quantity to a maximum quantity over a plurality of time periods established by the regulations.

5. The apparatus of claim 3, wherein the product data is the total weight of an ingredient of the regulated product.

6. The apparatus of claim 4, wherein a first time period is selected from the group of one day, seven days, 28 days, 30 days, 31 days, 45 days, 60 days, or 1 year.

7. The apparatus of claim 6, wherein the first time period is selected from the group of one day, seven days, 28 days, 30 days, 31 days, 45 days, 60 days, or 1 year, and a second time period is selected from the group of one day, seven days, 28 days, 30 days, 31 days, 45 days, 60 days, or 1 year.

8. The apparatus of claim 3, wherein the configuration to determine comprises a configuration to compare the consumer's purchases of the regulated product from the same location as the transaction being analyzed.

9. The apparatus of claim 8, wherein the configuration to determine comprises a configuration to compare the consumer's purchases of the regulated product that include locations that are different from the location of the transaction being analyzed.

10. The apparatus of claim 9, wherein the configuration to determine comprises a configuration to compare the consumer's purchases of the regulated product from a plurality of stores that are in the same chain as that store in which the transaction being analyzed is occurring, 11. The apparatus of claim 8, wherein the configuration to determine comprises a configuration to communicate with a clearinghouse that assesses the consumer's purchases of the regulated product over multiple purchase locations.

12. The apparatus of claim 1, wherein the configuration further comprises a configuration to store a selection of regulated products in a vending device.

13. The apparatus of claim 12, wherein the vending device is configured to deliver the product to the consumer if the transaction has been approved.

14. The apparatus of claim 12, wherein the consumer interface is configured to communicate with the vending device.

15. The apparatus of claim 14, wherein the consumer interface is substantially affixed to the vending device.

16. The apparatus of claim 14, wherein the vending device is networked to a computer.

17. The apparatus of claim 1, wherein the configuration further comprises a configuration to maintain an electronic log to document transactions of regulated products.

18. The apparatus of claim 17, wherein the configuration further comprises a configuration to update an electronic log once the product has been delivered to the consumer.

19. The apparatus of claim 18, wherein the electronic log comprises the number of the consumer and an amount of regulated product purchased by the consumer.

20. The apparatus of claim 19, wherein the electronic log comprises the weight of an ingredient of a regulated product.

21. A apparatus for conducting a sales transaction for a product that is subject to regulations governing its purchase comprising:
   a processor:
   a non-transitory medium containing processor executable instructions that when executed by the processor configure the apparatus to
   provide a consumer interface configured to receive identification information from a consumer, and to communicate transaction information to the consumer;
   offer the consumer a selection of products;
   allow the consumer to select a product:
   determine whether the sales transaction complies with an applicable regulation governing the sale of the regulated product by using the identification information and at least one product data derived from the regulated product delivering the product to the consumer;
wherein the regulated substance is selected from the group of pseudoephedrine, ephedrine, or phenylpropanolamine, the product data is the weight of pseudoephedrine; and
wherein the configuration to determine comprises a configuration that is based on the consumer's purchases of pseudoephedrine over a time period established by the regulations.

22. The apparatus of claim 21, wherein the configuration to determine comprises a configuration to compare the weight of pseudoephedrine to a maximum quantity over a time period.

23. The apparatus of claim 22, wherein the configuration to determine comprises a configuration to compare the weight of pseudoephedrine to a maximum quantity over a plurality of time periods established by the regulations.

24. The apparatus of claim 23, wherein a first time period is selected from the group of one day, seven days, 28 days, 30 days, 31 days, 45 days, 60 days, or 1 year.

25. The apparatus of claim 24, wherein the first time period is selected from the group of one day, seven days, 28 days, 30 days, 31 days, 45 days, 60 days, or 1 year, and a second time period is selected from the group of one day, seven days, 28 days, 30 days, 31 days, 45 days, 60 days, or 1 year.

26. The apparatus of claim 25, wherein the configuration to determine comprises a configuration to compare the consumer's purchases of the regulated product from the same location as the transaction being analyzed.

27. The apparatus of claim 26, wherein the configuration to determine comprises a configuration to compare the consumer's purchases of the regulated product that include locations that are different from the location of the transaction being analyzed.

28. The apparatus of claim 27, wherein the configuration to determine comprises a configuration to compare the consumer's purchases of the regulated product from a plurality of stores that are in the same chain as that store in which the transaction being analyzed is occurring.

29. The apparatus of claim 28, wherein configuration to determine comprises a configuration to communicate with a clearinghouse that assesses the consumer's purchases of the regulated product over multiple purchase locations.

30. An computer software product comprising:
a non-volatile storage medium, the non-volatile storage medium containing a set of processor executable instructions that, when executed by a processor configure a dispensing apparatus to:
provide a consumer interface configured to receive identification information from a consumer;
prompt the consumer to select a regulated product;
use the identification information and at least one product data derived from the regulated product to determine that the sales transaction complies with an applicable regulation governing the sale of the regulated product:
deliver the product to the consumer:
wherein the regulated product comprises a medication containing an ingredient subject to regulation, the ingredient comprising pseudoephedrine, ephedrine. or phenylpropanolamine; and
wherein the configuration to determinate is a configuration based on the consumer's purchases over a time period established by the regulations of regulated products selected from the group of the same medication, substantially similar medications, or medications containing the same regulated ingredient as that contained in the product the consumer desires to purchase.

31. The computer software product of claim 30, wherein the product data is a quantity of an ingredient of the regulated product.

32. The apparatus of computer software product 31, wherein the configuration to determine comprises a configuration to compare the ingredient quantity to a maximum quantity over a time period.

33. The computer software product of claim 32, wherein the configuration to determine comprises a configuration to compare the ingredient quantity to a maximum quantity over a plurality of time periods established by the regulations.

34. The computer software product of claim 32, wherein the product data is the total weight of an ingredient of the regulated product.

35. The computer software product of claim 33, wherein a first time period is selected from the group of one day, seven days, 28 days, 30 days, 31 days, 45 days, 60 days, or 1 year.

36. The computer software product of claim 35, wherein the first time period is selected from the group of one day, seven days, 28 days, 30 days, 31 days, 45 days, 60 days, or 1 year, and a second time period is selected from the group of one day, seven days, 28 days, 30 days, 31 days, 45 days, 60 days, or 1 year.

37. The computer software product of claim 32, wherein the configuration to determine comprises a configuration to compare the consumer's purchases of the regulated product from the same location as the transaction being analyzed.

38. The computer software product of claim 37, wherein the configuration to determine comprises a configuration to compare the consumer's purchases of the regulated product that include locations that are different from the location of the transaction being analyzed.

39. The computer software product of claim 38, wherein the configuration to determine comprises a configuration to compare the consumer's purchases of the regulated product from a plurality of stores that are in the same chain as that store in which the transaction being analyzed is occurring.

40. The computer software product of claim 37, wherein the configuration to determine comprises a configuration to communicate with a clearinghouse that assesses the consumer's purchases of the regulated product over multiple purchase locations.

41. The computer software product of claim 30, wherein the configuration further comprises a configuration to store a selection of regulated products in a vending device.

42. The computer software product of claim 41, wherein the vending device is configured to deliver the product to the consumer if the transaction has been approved.

43. The computer software product of claim 41, wherein the consumer interface is configured to communicate with the vending device.

44. The computer software product of claim 43, wherein the consumer interface is substantially affixed to the vending device.

45. The computer software product of claim 43, wherein the vending device is networked to a computer.

46. The computer software product of claim 30, wherein the configuration further comprises a configuration to maintain an electronic log to document transactions of regulated products.

47. The computer software product of claim 46, wherein the configuration further comprises a configuration to update an electronic log once the product has been delivered to the consumer.

48. The computer software product of claim 47, wherein the electronic log comprises the number of the consumer and an amount of regulated product purchased by the consumer.

49. The computer software product of claim 48, wherein the electronic log comprises the weight of an ingredient of a regulated product.

50. A computer software product for conducting a sales transaction for a product that is subject to regulations governing its purchase comprising:
 a non-transitory medium containing processor executable instructions that when executed by a processor configure a dispensing apparatus to
 provide a consumer interface configured to receive identification information from a consumer, and to communicate transaction information to the consumer;
 offer the consumer a selection of products;
 allow the consumer to select a product;
 determine whether the sales transaction complies with an applicable regulation governing the sale of the regulated product by using the identification information and at least one product data derived from the regulated product delivering the product to the consumer:
 wherein the product data is the weight of pseudoephedrine, the configuration to determine comprises a configuration that is based on the consumer's purchases of pseudoephedrine over a time period established by the regulations; and
 wherein the configuration to determine comprises a configuration to compare the weight of pseudoephedrine to a maximum quantity over a time period.

51. The computer software product of claim 50, wherein the configuration to determine comprises a configuration to compare the weight of pseudoephedrine to a maximum quantity over a plurality of time periods established by the regulations.

52. The computer software product of claim 51, wherein a first time period is selected from the group of one day, seven days, 28 days, 30 days, 31 days, 45 days, 60 days, or 1 year.

53. The computer software product of claim 52, wherein the first time period is selected from the group of one day, seven days, 28 days, 30 days, 31 days, 45 days, 60 days, or 1 year, and a second time period is selected from the group of one day, seven days, 28 days, 30 days, 31 days, 45 days, 60 days, or 1 year.

54. The computer software product of claim 53, wherein the configuration to determine comprises a configuration to compare the consumer's purchases of the regulated product from the same location as the transaction being analyzed.

55. The computer software product of claim 54, wherein the configuration to determine comprises a configuration to compare the consumer's purchases of the regulated product that include locations that are different from the location of the transaction being analyzed.

56. The computer software product of claim 55, wherein the configuration to determine comprises a configuration to compare the consumer's purchases of the regulated product from a plurality of stores that are in the same chain as that store in which the transaction being analyzed is occurring.

57. The computer software product of claim 56, wherein configuration to determine comprises a configuration to communicate with a clearinghouse that assesses the consumer's purchases of the regulated product over multiple purchase locations.

\* \* \* \* \*